US012789177B2

(12) United States Patent
De Ren et al.

(10) Patent No.: US 12,789,177 B2
(45) Date of Patent: Nov. 10, 2026

(54) PROCESS AND APPARATUS FOR REGENERATING CATALYST FROM A METHANOL TO OLEFINS PROCESS

(71) Applicant: UOP LLC, Des Plaines, IL (US)

(72) Inventors: Jan De Ren, Bracknell (GB); Matthew C. Cole, Evanston, IL (US); Richard A. Johnson, II, Algonquin, IL (US); Ian G. Horn, Streamwood, IL (US); Gregory R. Werba, Arlington Heights, IL (US); Ernest J. Boehm, Hanover Park, IL (US); Michael J. Tobin, Elmhurst, IL (US)

(73) Assignee: UOP LLC, Rosemont, IL (US)

( * ) Notice: Subject to any disclaimer, the term of this patent is extended or adjusted under 35 U.S.C. 154(b) by 518 days.

(21) Appl. No.: 18/471,782

(22) Filed: Sep. 21, 2023

(65) Prior Publication Data

US 2024/0342697 A1 Oct. 17, 2024

Related U.S. Application Data

(60) Provisional application No. 63/495,542, filed on Apr. 11, 2023.

(51) Int. Cl.
*B01J 38/12* (2006.01)
*B01J 38/40* (2006.01)

(52) U.S. Cl.
CPC ............... *B01J 38/12* (2013.01); *B01J 38/40* (2013.01)

(58) Field of Classification Search
CPC .......... B01J 38/12; B01J 38/40; C07C 29/151
See application file for complete search history.

(56) References Cited

FOREIGN PATENT DOCUMENTS

| | | | | | |
|---|---|---|---|---|---|
| CN | 103214333 | A | * | 7/2013 | |
| CN | 108339357 | A | * | 7/2018 | ............. B01D 53/18 |
| CN | 115055211 | A | * | 9/2022 | ......... B01D 53/1475 |
| WO | WO-2005105956 | A1 | * | 11/2005 | ............... C10G 3/62 |

OTHER PUBLICATIONS

Machine translation of Wang et al. (Year: 2018).*
Machine translation of Shi et al. (Year: 2022).*
Machine translation of Xing et al. (Year: 2013).*

* cited by examiner

*Primary Examiner* — Brian A McCaig
(74) *Attorney, Agent, or Firm* — Paschall & Associates, LLC; James C. Paschall

(57) ABSTRACT

A process for regenerating catalyst from an MTO process is disclosed. The process comprises providing an oxygen stream and a preheated carbon dioxide recycle stream and mixing the oxygen stream and the preheated carbon dioxide recycle stream to provide a carbon dioxide rich oxidation stream. The carbon dioxide rich oxidation stream is passed to a regenerator unit to provide a carbon dioxide rich flue gas stream. The carbon dioxide rich flue gas stream is filtered to remove the catalyst fines to produce a filtered flue gas stream. A carbon dioxide recycle stream is taken from the filtered flue gas stream.

20 Claims, 12 Drawing Sheets

PROCESS AND APPARATUS FOR REGENERATING CATALYST FROM A METHANOL TO OLEFINS PROCESS

FIELD

The field is related to a process and apparatus for regenerating catalyst from a fluidized catalytic process. Particularly, the field relates to a process for regenerating catalyst from a fluidized catalytic process with a carbon dioxide recycle stream.

BACKGROUND

Carbon dioxide is a so-called greenhouse gas which concentration many desire to suppress in the atmosphere. Carbon dioxide may be converted to oxygenates such as methanol or dimethyl ether. Molecular sieves such as microporous crystalline zeolite and non-zeolitic catalysts, particularly silicoaluminophosphates (SAPO), are known to promote the conversion of oxygenates to hydrocarbon mixtures, particularly hydrocarbon mixtures composed largely of light olefins. The highly efficient Methanol to Olefin (MTO) process may convert oxygenates to light olefins which had been typically considered for plastics production. Light olefins produced from the MTO process are highly concentrated in ethylene and propylene.

Alternative processes are also used for light olefins production. In one approach, hydrocarbon oxygenates and more specifically methanol or dimethyl ether are used as an alternative feedstock for producing light olefin products. Once the oxygenates are formed, the process includes catalytically converting the oxygenates, such as methanol, into the desired light olefin products in a methanol to olefin (MTO) process. In the MTO process, carbonaceous material, i.e., coke, is deposited on the catalyst as it moved through the reaction zones. The carbonaceous material is removed from the catalyst by oxidative regeneration in one or more regeneration zones wherein a moving bed of the catalyst particles withdrawn from the reaction zones is contacted with an oxygen-containing gas stream at sufficient temperature and oxygen concentration to allow the desired amount of the carbonaceous materials to be removed by combustion from the catalyst. In some cases, it is advantageous to only partially regenerate the catalyst, e.g., to remove from about 30 to 80 wt-% of the carbonaceous material. During this regeneration there is incomplete combustion of coke resulting in a mixture of water, carbon dioxide and carbon monoxide. The ratio of net carbon dioxide to carbon monoxide produced during regeneration may range from about 1.0 to about 10.0. This will result in a carbon monoxide concentration in the flue gas between 0 mol % and 8 mol %.

Light olefin oligomerization is a process that can perform the conversion of C2 through C6 olefins into more desirable products. More specifically, it can convert C2 through C6 olefins into liquid fuels, including naphtha, jet fuel, and diesel range products.

Jet fuel is one of the few petroleum fuels that cannot be replaced easily by electrical motor systems because a high energy output is required to fuel planes which cannot be supplied with electric motors. Large incentives are currently available for green jet fuel in certain regions.

Conventional catalyst regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator.

Flue gas formed by burning the coke in the regenerator is treated for removal of particulates and conversion of carbon monoxide (CO), after which the flue gas is normally discharged into the atmosphere. Further, incomplete combustion to carbon monoxide can result from poor fluidization or aeration of the coked catalyst in the regenerator or poor distribution of coked catalyst into the regenerator. Generally, the flue gas exiting the regenerator contains carbon monoxide, carbon dioxide, nitrogen and water, along with smaller amounts of other species. Flue gas treatment methods are effective, but the capital and operating costs are high.

The flue gas can also optionally be treated to remove catalyst fines and other particulate. The treated flue gas can then be discharged to the atmosphere.

Environmental concerns over greenhouse gas emissions have led to an increasing emphasis on separating the greenhouse gases before releasing the flue gases into atmosphere. Carbon dioxide is the most significant long-lived greenhouse gas in earth's atmosphere. Carbon dioxide capture from flue gases is still expensive, both from a capital expenditures and operational utility costs standpoint. For fluidized catalytic processes, air is used for regenerating the spent catalyst. As a result of this operation, the carbon dioxide in the flue gas has a lower concentration in contrast to the concentration of undesired components from a carbon dioxide capture perspective resulting in high capital expenditures due to a large volume of the flue gas, but also large operational utility costs as high solvent circulating rates and solvent regeneration duties. Apart from this, the flue gas requires extensive flue gas treatment prior to carbon capture in order to meet stringent specifications to avoid high solvent degradation rates. This is resulting in high capital expenditures and operational utility costs with various and longer impurities removal operations.

With decades of research and recent changes to government regulations, there is a great need to find ways to reduce carbon intensity of the products such as petrochemicals, biofuels, or efuels from an MTO unit. In an MTO unit, usually carbon dioxide may be captured from the MTO regenerator flue gas using a solvent process, which requires a great deal of additional equipment and energy to regenerate the solvent.

Therefore, there is a need for a process and an apparatus which reduces capital expenditures and operational utility costs of the carbon dioxide and, optionally, carbon monoxide capture section as flue gas treatment section, whilst improving energy efficiency and energy recovery.

SUMMARY

The present disclosure provides a process and an apparatus for regenerating catalyst from a MTO process. Generally, atmospheric air is used in the regenerator for burning the coke from spent catalyst. Atmospheric air has a high amount of nitrogen which leads to a low carbon dioxide partial pressure. The present process discloses providing a carbon dioxide rich oxidation stream to the regenerator in place of air. The flue gas from the regenerator in accordance with the present process has an economically desirable amount of carbon dioxide from a carbon dioxide capture perspective as compared to the undesired components due to use of air in regenerator.

BRIEF DESCRIPTION OF THE DRAWINGS

The various embodiments will hereinafter be described in conjunction with the following FIGURES, wherein like numerals denote like elements.

DEFINITIONS

Figure 1:
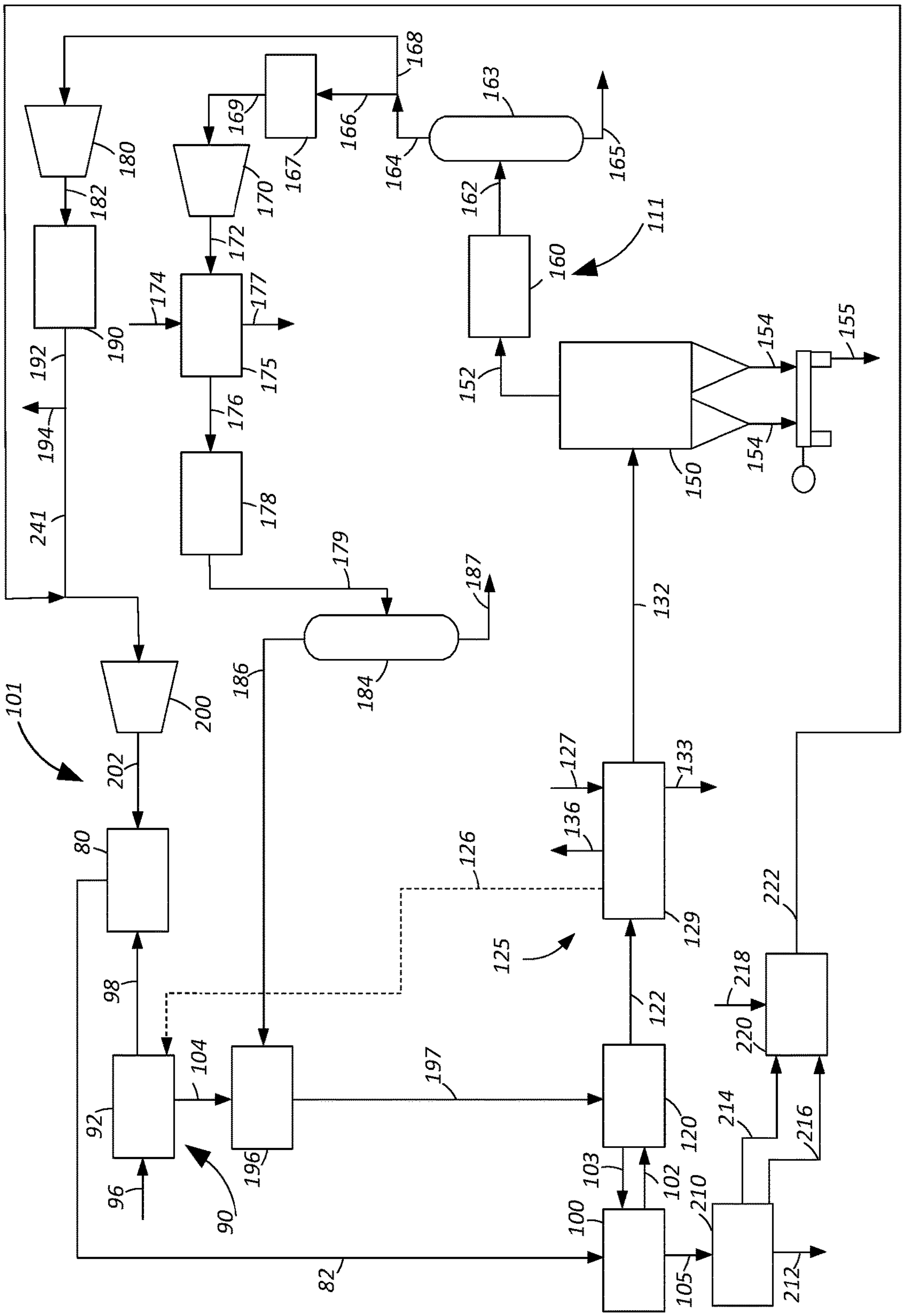
FIG. 1 is a schematic diagram of a process and an apparatus for regenerating catalyst from an MTO unit in accordance with an exemplary embodiment of the present disclosure.

The term “communication” means that material flow is operatively permitted between enumerated components.

The term “downstream communication” means that at least a portion of material flowing to the subject in downstream communication may operatively flow from the object with which it communicates.

The term “upstream communication” means that at least a portion of the material flowing from the subject in upstream communication may operatively flow to the object with which it communicates.

The term “direct communication” or “directly” means that flow from the upstream component enters the downstream component without passing through a fractionation or conversion unit to undergo a compositional change due to physical fractionation or chemical conversion.

The term “column” means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripper columns typically feed a top tray and take main product from the bottom.

As used herein, the term “separator” means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term “a component-rich stream” means that the rich stream coming out of a vessel has a greater concentration of the component than the feed to the vessel.

As used herein, the term “rich” means greater than 50%, suitably greater than 75% and preferably greater than 90%.

DETAILED DESCRIPTION

To date MTO catalyst regeneration is performed by utilizing air comprising mainly nitrogen and oxygen. Because the process uses air, it requires a large air blower and introduces nitrogen into the flue gas, which is not desirable for the carbon dioxide capture. In order to capture carbon dioxide from this process, an adsorber with a solvent is required, which then requires additional equipment and utilities to regenerate.

MTO catalyst regeneration using a mixture of carbon dioxide and oxygen, in combination with a potential high-pressure boiler (for saving compression costs) integrated with an electrolyzer, carbon capture unit, MeOH synthesis unit in addition to optionally valorizing off-gases and oxygenates from a olefins to jet complex (OTJ) to heat or produce syngas would be useful. A higher degree of process and utility integration in OTJ complex is anticipated to result in reduced capital and operational expenses and reduction in carbon intensity. Furthermore, the size of the flue gas treatment section may be reduced when using carbon dioxide to carry oxygen rather than air because less volume of gas would be needed due to carbon dioxide having a greater molecular weight than nitrogen which is the largest component of air.

In the present disclosure, an integration of oxycombustion between the methanol synthesis and MTO steps is disclosed which offers many benefits in an overall carbon dioxide to jet fuel complex. In the present disclosure, a byproduct oxygen generated during water electrolysis for hydrogen production can be sent directly to the MTO regenerator, eliminating the need for a makeup air blower and greatly reducing the size of the flue gas recycle compressor, both of which offer significant electrical utilities reduction in the MTO regenerator section. Additionally, the use of oxygen to burn MTO catalyst coke instead of air causes the flue gas to become concentrated in carbon dioxide instead of nitrogen. When the flue gas is dilute in carbon dioxide, the carbon is difficult to capture efficiently, and the stream is typically burned and the carbon emitted to the atmosphere. Therefore, with flue gas concentrated in carbon dioxide instead of nitrogen, it becomes possible to efficiently recover the carbon dioxide in the flue gas and recycle it to the methanol synthesis unit, thereby avoiding any net carbon dioxide release.

A process for regenerating catalyst from a fluidized catalytic process is disclosed. The fluidized catalytic process can be any fluid catalytic process that regenerates catalyst including a MTO process. The flue gas from a regenerator of a fluidized catalytic process, is used to make superheated steam and saturated steam.

Heat can be recovered from the flue gas at different points depending on the needs of the process. Superheated high pressure steam and saturated steam at various levels can be produced to maximize heat recovery from the flue gas streams. For partial burn regenerators, a CO combustor may be deployed upstream of the steam generators.

When air is used as a combustion gas, high amounts of inerts, particularly nitrogen, end up in the regenerator flue gas leading to a lower carbon dioxide partial pressure. This occupies unnecessary volume resulting in large equipment sizes for regenerator and downstream flue gas treatment equipment. Due to a low carbon dioxide partial pressure, the cost of carbon dioxide capture is relatively high, which may be a reason for a reluctance of refiners towards implementing carbon dioxide capture technology. When the captured carbon dioxide stream is fed into a methanol plant, any nitrogen or other inerts left in the captured carbon dioxide stream will build up in the system. This would require purges, which could be detrimental to the overall process efficiency. The disclosed process replaces the air with a carbon dioxide rich oxidation stream comprising carbon dioxide and up to 35 mole % of oxygen. The carbon dioxide rich oxidation stream comprising carbon dioxide and oxygen provides a significant increase in carbon dioxide partial pressure in the flue gas and enables low capital expenditures and operational utility costs for carbon dioxide capture.

The flue gas from the regenerator in a MTO process may include unconverted carbon monoxide. The unconverted carbon monoxide in the flue gas can be combusted to carbon dioxide in a CO combustor that produces high-pressure steam. The flue gas is removed from the regenerator and charged to the CO combustor in heat recovery section where a combustion air stream is added to burn the flue gas releasing heat which is recovered. The use of air in the CO combustor can also lead to a buildup of nitrogen gas in the flue gas stream obtained from the CO combustor. This nitrogen from the CO combustor can be eliminated by replacing the air fed to the CO combustor, the dry air purge points and other purges like fluffing air in the regenerator with a portion of the carbon dioxide rich oxidation stream comprising oxygen and the recycle carbon dioxide stream.

The regenerator unit can be a partial burn unit or a complete burn unit. In a partial burn regenerator unit, the flue gas contains carbon monoxide, typically up to about 10%, and more specifically between about 2% to about 5%, which is used as the primary fuel source in a downstream CO combustor where the flue gas is burned releasing heat which is recovered. By running the regenerator in a partial burn mode to maximize the carbon monoxide yield the unit will limit the amount of heat released in the regenerator relative to completely burning the coke to carbon dioxide. This will lower the regenerator temperature.

In FIG. 1, in accordance with an exemplary embodiment, a process and apparatus 101 is shown for regenerating catalyst from a MTO reactor 100.

One aspect of the present disclosure comprises a process for regenerating catalyst from a fluidized catalytic process. The method comprises providing an oxygen stream in line 104 from an oxygen source 90. Usually, the oxygen stream is provided from an air separation unit (ASU). However, applicant has found an oxygen stream may be taken from an electrolyzer 92 which may be the oxygen source 90. Thus, the oxygen stream in line 104 may be provided from the electrolyzer 92. In an embodiment, the oxygen source 90 for providing the oxygen stream 104 can be selected from an air separation unit (ASU) or an electrolyzer 92. In an exemplary embodiment, the oxygen source 90 is an electrolyzer 92.

Various types of electrolyzers may be used as the electrolyzer 92 including but not limited to a polymer electrolyte membrane/proton exchange membrane (PEM/PEMEC), an alkaline electrolysis cell (AEC), an anion exchange membrane (AEM), and a solid oxide electrolysis cell (SOE/SOEC). In accordance with the present disclosure, the utilities generated in the MTO process could be used in the electrolysis section of the electrolyzer 92. Specifically, the superheated steam stream in line 126 may be used in the electrolyzer 90. For PEM, AEC, AEM and SOEC electrolyzers, the electricity generated in a power recovery section for the MTO regenerator 120 (not shown) could be used. In addition, for a SOEC electrolyzer, heat in the form of steam could be used in SOEC to reduce the need for utilities generated and exported into the process and apparatus 101. For the SOEC electrolyzer, about 25% to about 30% of the total energy requirement could be supplied by heat. In an exemplary embodiment, heat generated from MTO regenerator flue gas may be supplied to the SOEC electrolyzer. Apart from taking heat generated from the MTO regenerator flue gas, other sources of heat are also envisioned for integration. Furthermore, apart from using electricity for splitting water, electricity generated in the process unit as disclosed earlier could also be used in compression for the electrolyzer 92 such as in AEC, AEM, and PEM electrolyzer. The electrolyzer 92 may use the electricity generated in the expander turbine if installed in the MTO regenerator flue gas section. In an exemplary embodiment, the electrolyzer 92 may use thermal energy or steam generated in the MTO regenerator 120.

Referring to FIG. 1, the oxygen source 90 is an electrolyzer 92. The electrolyzer 90 can be selected from one or more electrolyzers including but not limited to polymer electrolyte membrane/proton exchange membrane (PEM/PEMEC), alkaline electrolysis cell (AEC), anion exchange membrane (AEM), and solid oxide electrolysis cell (SOE/SOEC) as previously mentioned. A water stream in line 96 is provided to the electrolyzer 92. The water stream in line 96 may include water recycled from the MTO reactor section 100. Heat is also provided to the electrolyzer 92 from any suitable heat source such as from steam in line 126. In an exemplary embodiment, the heat to the electrolyzer 92 is supplied from any suitable process unit of the MTO unit. However, heat to the electrolyzer 92 can be supplied from any other heat sources. The various utilities generated in the MTO unit can be used in the electrolyzer 92. Hydrogen produced in the electrolyzer 92 can be withdrawn in line 98 and fed to the methanol synthesis unit 80. An oxygen stream is withdrawn in line 104 from the electrolyzer 92 and passed to the mixer 196.

The oxygen stream in line 104 and the carbon dioxide recycle stream in line 186 are passed to a mixing unit or mixer 196 to provide a carbon dioxide rich oxidation stream in line 197. The carbon dioxide rich oxidation stream in line 197 is passed to the regenerator unit 120. A spent catalyst stream from an MTO reactor 100 in line 102 is also passed to the regenerator unit 120. In an aspect, the carbon dioxide rich oxidation stream in line 197 comprises an oxygen concentration of no more than 30 mole %.

Methanol may be produced from a methanol synthesis unit 80 by hydrogenation of carbon dioxide and, optionally, carbon monoxide over a methanol synthesis catalyst. A suitable methanol synthesis catalyst may be a copper on a zinc oxide and alumina support. Synthesis conditions include a temperature of about 200° C. to about 300° C. and about 3500 kPa(g) (500 psig) to about 10000 kPa(g) (1500 psig). Reaction equilibrium typically requires methanol separation and recycle of unreacted reagents to the synthesis reaction. A methanol stream is provided in line 82.

The methanol stream in line 82 is charged to a MTO reactor 100 and contacted with an MTO catalyst at MTO reaction conditions to convert methanol to olefins and water. The methanol stream in line 82 may include methanol, dimethyl ether, ethanol or combinations thereof. The MTO reactor 100 may fluidize catalyst at fast fluidized conditions. The MTO catalysts may be a silicoaluminophosphate (SAPO) catalyst. SAPO catalysts and their formulation are generally taught in U.S. Pat. Nos. 4,499,327A, 10,358,394 and 10,384,986. The MTO reaction conditions include contact with a SAPO catalyst at a pressure between about 140 kPa(g) (20 psig) and about 400 kPa(g) (60 psig). The MTO reaction temperature should be between about 325° C. to about 510° C. A weight hourly space velocity ("WHSV") in the MTO reactor is in the range of about 1 to about 15 $hr^{-1}$. The MTO catalyst is separated from the product olefin stream after the MTO reaction.

In the MTO process, catalyst particles are repeatedly circulated between the MTO reactor 100 and the MTO regenerator unit 120. During regeneration, coke deposited on the catalyst particles during reaction in the reaction zone is removed at elevated temperatures by oxidation in the regenerator unit 120. The removal of coke deposits restores the activity of the catalyst particles to the point where they can be reused in the MTO reactor 100. The present disclosure is directed towards handling the flue gas stream in a line 122 from the regenerator. The regenerated catalyst is discharged from the regenerator unit 120 in line 103 and recycled to the MTO reactor 100.

A product stream of light olefins comprising ethylene and propylene and other olefins along with water and oxygenates are discharged from the MTO unit in a product line 105. Line 105 transports MTO products to an MTO product unit 210. The MTO product unit 210 may comprise a light olefin recovery process for separating light olefins for further valorization. The MTO product unit 210 may include an olefin cracking process for cracking larger olefins to light olefins or it may alternatively include an oligomerization unit for oligomerizing the lighter olefins up to fuel range olefins such as in an olefins to fuels unit. An oligomerization unit may include a hydrogenation section for hydrogenating fuel range olefins to saturated fuels. Products are discharged from the MTO product unit 210 in a product line 212. Moreover, off-gases and/or undesirable liquid by-products from fractionation columns in the MTO product unit 210 are discharged in line 214 while heavy oxygenates generated from the MTO reactor 100 are discharged in line 216 from the MTO product unit 210. Some or all of the off-gases and the heavy oxygenates may be fed from the MTO product unit 210 to a partial oxidation unit 220.

In the partial oxidation unit 220 oxygen is added in line 218 in less than stochiometric proportions to achieve only partial oxidation of the hydrocarbons and oxygenates to carbon monoxide. From the partial oxidation unit 220, a partial oxidation stream rich in carbon monoxide is provided in line 222. The destination of the partial oxidation stream in line 222 may be the methanol synthesis unit 80 for synthesis of methanol. Because only partial oxidation as opposed to complete combustion is performed in the partial oxidation unit 220, it is likely that very little water will be formed and contaminant generation would be minimal. Accordingly, the carbon monoxide rich partial oxidation stream in line 222 may be fed to the impurity depleted synthesis stream in line 241. However, the composition of the partial oxidation stream in line 222 will determine the injection location. For example, if contaminant concentration is high in the partial oxidation stream in line 222, the injection location of the partial oxidation stream may be in line 132 upstream of the decontamination reactor. Moreover, if trace contaminants are present in the partial oxidation stream requiring removal, the injection location may be in line 182 upstream of a contaminant removal unit 190. Injection location will also be impacted by the pressure of the partial oxidation stream in line 222 and the pressure of the stream in the injection location.

It is beneficial to the overall economics of the process to maximize the carbon monoxide concentration of the partial oxidation stream in line 222 and minimize the amount of oxygen. This will reduce the amount of hydrogen required by the methanol synthesis unit 80 to produce the same amount of methanol and will generate more steam, reducing overall utility consumption. The reactions in the methanol synthesis unit 80 and their heat of reaction (delta H) may be as below:

$$CO_2+3H\leftrightarrow CH_3OH+H_2O \text{ delta H}=-49.5 \text{ KJ/mol}$$

$$CO+2H_2\leftrightarrow CH_3OH \text{ delta H}=-90.5 \text{ KJ/mol}$$

From the MTO regenerator 120, a carbon dioxide rich flue gas stream in line 122 is withdrawn. The carbon dioxide rich flue gas stream in line 122 is at a high temperature and heat can be recovered from the carbon dioxide rich flue gas stream in line 122 prior to further treatment. A full or partial combustion MTO regenerator 120 may operate at a temperature ranging from about 625° C. to about 740° C. or from about 640° C. to about 700° C.

The carbon dioxide rich flue gas stream in line 122 is passed to a heat recovery section 125 for transferring heat from the carbon dioxide rich flue gas stream in line 122 to a boiler feed water stream in line 127 to form a partially cooled carbon dioxide rich flue gas stream in line 132 and a steam stream in line 126. The heat recovery section 125 can include a HRSG 129. As such, the carbon dioxide rich flue gas stream in line 122 is passed to the superheated steam section of the HRSG 129 to transfer heat to a saturated steam stream and produce a superheated steam stream in line 126 and a partially cooled carbon dioxide rich flue gas stream. The partially cooled carbon dioxide rich flue gas stream is then heat exchanged with a boiler feed water stream in line 127 to cool the partially cooled carbon dioxide rich flue gas stream in a saturated steam section to produce the saturated steam stream and a cooled carbon dioxide rich flue gas stream in line 132. A blowdown stream in line 133 is also withdrawn from the saturated steam section. A portion of the saturated steam stream may be superheated in the superheated steam section while the remainder saturated steam stream in line 136 can be sent to other parts of the process and apparatus for use as needed. The partially cooled carbon dioxide rich flue gas stream in line 132 is withdrawn from the saturated steam section of the HRSG 129 and passed to the decontamination reactor 140. The outlet temperature of the flue gas stream from the HRSG 129 may range from about 150° C. to about 290° C.

The partially cooled carbon dioxide rich flue gas stream in line 132 may be filtered for particle removal in a filter 150. The filter 150 may comprise a bag filter or an electrostatic precipitator. In one embodiment of the process, the filter 150 is a bag filter. The bag filter 150 may operate at an atmospheric pressure. In an alternative embodiment, the filter 150 may be a high-pressure filter designed to operate at nearly the same pressure as the regenerator unit 120. The advantage of a high-pressure filter is the potential to reduce the power required in downstream compressors. The filtered material from the filter section 150 may include catalyst fines which may be removed in the filter section 150. A filtrate material can be removed from the process in line 155. A filtered flue gas stream in line 152 is passed to the carbon dioxide separation unit 111 to separate carbon dioxide from the filtered flue gas stream.

In an aspect, the operating pressure of the regenerator 120 may be between about 70 kPa(g) (10 psig) and about 350 kPa(g) (50 psig), depending on the processing objectives of the MTO reactor 100. The operating pressure of the filter 150 may be between about 70 kPa(g) (10 psig) and 350 kPa(g) (50 psig) or between about 10 kPa(g) (1.5 psig) and the atmospheric pressure, depending on the design constraints of the filter type. This difference in pressure potentially represents a significant amount of energy. In an alternative embodiment, the carbon dioxide rich flue gas stream in line 122 may be passed to a third stage separator (not shown), which will separate catalyst fines into a catalyst-rich underflow stream and a catalyst-depleted overflow stream. The catalyst-depleted overflow stream is passed to an expander to recover hydraulic energy. The expanded catalyst-depleted overflow stream may be passed to the heat recovery section 125. The expander may be mechanically connected to a generator to produce electricity or to a compressor, to reduce power consumption by the compressor.

The filtered flue gas stream in line 152 still has a significantly high temperature. Heat energy can still be recovered from the filtered flue gas stream in line 152. Optionally, the filtered flue gas stream in line 152 may be cooled in a first cooler 160 and passed to a first knockout drum (KOD) 163. Alternatively, the filtered flue gas stream in line 152 may be passed directly to the first KOD 163 without further cooling. The first cooler 160 may use cooling water and/or chilled water as cooling medium. Alternatively, the first cooler 160 can be an air cooler. In an aspect of the present disclosure, the first cooler 160 may be optional and the filtered flue gas stream in line 152 may be directly passed to the first KOD 163.

In the first KOD 163, water is separated from a cooled filtered flue gas stream in line 162 to provide a carbon dioxide stream which is withdrawn from the top of the KOD in line 164. Water is withdrawn in stream 165 from the bottom of the first KOD 163. The present process recycles some of the carbon dioxide stream in line 164 to the regenerator unit 120. Accordingly, a portion of the carbon dioxide stream in line 164 can be taken and mixed with the oxygen stream in line 104 to provide the carbon dioxide rich oxidation stream in line 197 for the MTO regenerator unit 120. In an embodiment, the carbon dioxide stream is separated into the carbon dioxide stream for recycling in line 166 and a carbon dioxide stream for methanol synthesis in line 168.

The carbon dioxide stream for recycling in line 166 may be passed to a carbon dioxide recycle compressor 170 to provide a compressed carbon dioxide recycle stream in line 172. The compressed carbon dioxide recycle stream in line 172 at the outlet of the carbon dioxide recycle compressor 170 is at a high temperature. The compressed carbon dioxide recycle stream in line 172 may have a temperature of about 220° C. (428° F.) to about 260° C. (471° F.). The compressed carbon dioxide recycle stream in line 172 can be passed to a steam generator 175 to provide a partially cooled carbon dioxide recycle stream in line 176 and a steam stream in line 177 from a water stream in line 174. In an exemplary embodiment, the generator 175 is a low-pressure steam generator 175 to provide a low-pressure steam stream in line 177. The partially cooled carbon dioxide recycle stream in line 176 is cooled in a second cooler 178 to provide a cooled carbon dioxide recycle stream in line 179 which is passed to a second KOD 184. The second cooler 178 can be an air cooler. Alternatively, the second cooler 178 may use cooling water and/or chilled water as cooling medium.

The cooling and condensing of the cooled filtered flue gas stream in line 152 using the first cooler 160 may result in aqueous phase formation. This could lead to carbonic acid formation due to reaction of carbon dioxide with water. The formation of carbonic acid may cause carbonic acid corrosion to downstream equipment. Therefore, the metallurgy of first cooler 160 and the first KOD 163 is suitably selected to withstand any carbonic acid corrosion. In accordance with an embodiment of the present disclosure, a heater 167 may be present upstream of the carbon dioxide recycle compressor 170. In accordance with an aspect, the heater 167 may be used to increase the temperature of the carbon dioxide stream for recycling in line 166 to provide a heated carbon dioxide stream for recycling in line 169 which is passed to the carbon dioxide recycle compressor 170. In accordance with an exemplary embodiment, the carbon dioxide stream for recycling in line 166 is passed through the heater 167 to increase the temperature of the carbon dioxide stream by about 5° C. (9° F.) to about 50° C. (90° F.) above the dew point of the carbon dioxide stream to avoid carbonic acid corrosion in any of the downstream equipment. The heated carbon dioxide stream for recycling in line 169 is passed to the carbon dioxide recycle compressor 170 to provide the compressed carbon dioxide recycle stream in line 172 and passed to the low-pressure steam generator 175 and the second cooler 178 as described above. The heater 167 is advantageously located downstream of the first KOD 163 to permit greater condensation of water and its separation in the KOD.

In the second KOD 184, water is separated from the cooled carbon dioxide recycle stream in line 179 to provide a dry carbon dioxide recycle stream which is withdrawn from the top of KOD in line 186. Water is withdrawn in stream 187 from the bottom of the second KOD 184. The dry carbon dioxide recycle stream in line 186 is passed to the MTO regenerator 120 after mixing with the oxygen stream in line 104 in the mixer 196. In some embodiments, a de-oxygenation operation may also be included in the carbon dioxide separation unit 111 or the decontamination reactor 140 in order to meet the specifications for carbon dioxide use.

The carbon dioxide stream for methanol synthesis in line 168 may also require preparation to be used for methanol synthesis. The methanol synthesis carbon dioxide stream should be compressed to methanol synthesis pressure. However, the methanol synthesis carbon dioxide stream in line 168 may require treatment in a pressure swing adsorption (PSA) unit or a thermal swing adsorption (TSA) unit for trace removal of contaminants like oxygen and optionally water. Other particulate matter may be removed in the contaminant removal unit 190. The methanol synthesis carbon dioxide stream in line 168 may be compressed in a methanol carbon dioxide compressor 180 up to an intermediate pressure suitable for contaminant removal. A compressed synthesis carbon dioxide stream in line 182 may be fed to a contaminant removal unit 190 for removal of contaminants. A contaminant depleted carbon dioxide stream in line 192 emerges from the contaminant removal unit 190. A storage carbon dioxide stream in line 194 may be taken to storage from the contaminant depleted carbon dioxide stream in line 192. A contaminant depleted synthesis stream may be taken in line 241 to methanol synthesis perhaps after supplementation with the stream in the partial oxidation stream in line 222.

In an exemplary embodiment, the contaminant removal unit 190 is a pressure swing adsorption (PSA) unit. The compressed synthesis carbon dioxide stream in line 182 may be passed to a pressure swing adsorption (PSA) unit 190 to remove or reduce the concentration of contaminants in the compressed synthesis carbon dioxide stream in line 182 to a lower level. The contaminant(s) are adsorbed on the adsorbent present in the PSA unit 190 while carbon dioxide does not adsorb on the adsorbent and passes through the bed. The PSA adsorbent may be selected from silica gel, NaY zeolite and 13X zeolite. The PSA unit 190 may comprise a single layer or multi-layer bed of adsorbent of different composition. The light molecules such as carbon dioxide may leave the PSA unit 190 at high pressure in a contaminant depleted stream in line 192. The adsorbed heavy molecules are then desorbed and recovered at a lower pressure from the PSA unit 190.

In an exemplary embodiment, the contaminant removal unit 190 is a temperature swing adsorption (TSA) unit. The compressed synthesis carbon dioxide stream in line 182 may be passed to a TSA unit 190 to remove or reduce the concentration of contaminants in the compressed synthesis carbon dioxide stream in line 182 to a lower level. The contaminant(s) are adsorbed on the adsorbent present in the TSA unit 190 while carbon dioxide does not adsorb on the adsorbent and passes through the bed. The adsorbent may be selected from APG-III, molecular organic frameworks, NaY zeolite and 13X zeolite. The TSA unit 190 may comprise a single layer or multi-layer bed of adsorbent of different composition. The light molecules such as carbon dioxide may leave the TSA unit 190 at low temperature in a contaminant depleted stream in line 192. The adsorbed heavy molecules are then desorbed and recovered at a higher temperature such as above 288° C. (550° F.) from the TSA unit 190.

Prior to methanol synthesis, the contaminant depleted synthesis stream in line 241 may be further compressed in a synthesis compressor 200 to synthesis pressure. A synthesis carbon dioxide stream is provided in line 202 to the methanol synthesis unit 80 for providing methanol for the MTO reactor 100.

In accordance with an exemplary embodiment, of the present disclosure, the methanol synthesis unit 80 comprises a reverse water gas shift section and a methanol conversion section. The synthesis carbon dioxide stream in line 202 and a portion of the hydrogen stream in line 98 are passed to the reverse water gas shift section. The combined feed stream may be passed to a booster compressor to compress the combined feed to a particular pressure required by the reverse water gas shift section. In an exemplary embodiment, the reverse water gas shift reactor may operate at a pressure of about 800 kPa(a) (116 psia) to about 1,200 kPa(a) (175 psia) about 900 kPa(a) (131 psia) to about 1.100 kPa(a) (160 psia). The combined feed stream may be heated before passing to the reverse water gas shift reactor. In accordance with an exemplary embodiment, the reverse water gas shift reactor may operate at a temperature of about 350° C. (662° F.) to about 600° C. (1112° F.) about suitably about 400° C. (752° F.) to about 500° C. (932° F.). A suitable reverse water gas shift catalyst may be a copper on a zinc oxide and alumina support. Reaction equilibrium typically requires reactor products cooling, separation, and recycle of unreacted reagents to the reverse water gas shift reaction to obtain sufficient conversion.

The product of the reverse water gas shift reactor is a syngas, which is a mixture of carbon monoxide, carbon dioxide, hydrogen, and water. The syngas, optionally with another portion of hydrogen, may be passed to a methanol conversion section.

Methanol conversion may comprise hydrogenation of carbon monoxide to methanol. A methanol conversion catalyst may be a copper on a zinc oxide and alumina support. Reactor conditions of the methanol conversion reactor may include a temperature of about 150° C. (302° F.) to about 300° C. (572° F.) and a pressure of about 5 MPa(a) (727 psia) to about 10 MPa(a) (1454 psia) provide over 99% selectivity. The methanol conversion reaction is exothermic and is favored by low reaction temperatures. In an embodiment, the methanol conversion unit may comprise two reactors in series with an intercooler. In a further alternative embodiment, one or more of the reactors may be a water-cooled reactor or a gas-cooled reactor.

In an alternative exemplary embodiment, the methanol synthesis unit 80 may employ a direct carbon dioxide hydrogenation reactor instead of employing both a reverse water gas shift reactor and a methanol conversion reactor. In a carbon dioxide hydrogenation reactor, carbon dioxide is mixed with hydrogen, heated and charged to a carbon dioxide hydrogenation reactor to be contacted with a bed of methanol conversion catalyst to produce methanol. Reactor effluent may be flashed to recycle gaseous reactants while liquid effluent is fractionated to provide an overhead methanol product stream and a bottoms stream of water. Conditions and catalyst for the direct carbon dioxide hydrogenation may be about the same as for hydrogenation of carbon monoxide.

Figure 2:
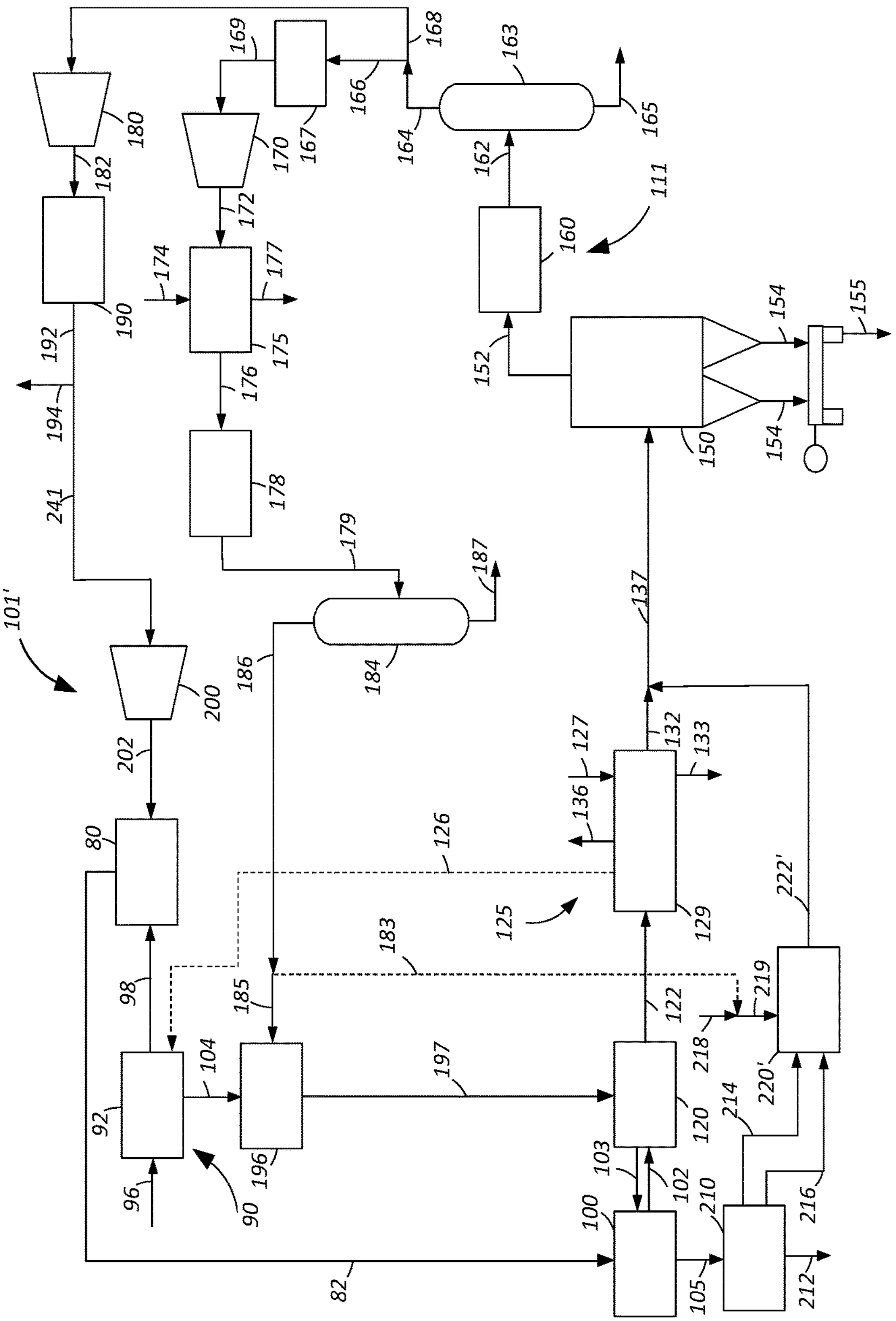
FIG. 2 is a schematic diagram of a process and an apparatus for regenerating catalyst from an MTO unit in accordance with another exemplary embodiment of the present disclosure.

Turning now to FIG. 2, another exemplary embodiment of a process and an apparatus 101' for regenerating catalyst from a MTO reactor 100 is addressed. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol (').

In the embodiment of FIG. 2, the oxidation unit 220' is operated in full combustion mode converting hydrocarbons all the way to carbon dioxide and water. The oxidation unit 220' may be a fired heater that provides various heater duties in the complex. In an aspect, a portion of the carbon dioxide recycle stream in line 186 may be passed to the oxidation unit 220' to dilute the oxygen stream passed to the oxidation unit 220'. As shown in FIG. 2, a portion of the dry carbon dioxide recycle stream may be taken as a first portion stream in line 183 and passed to the oxidation unit 220' to dilute oxygen stream in line 218. The first portion of the carbon dioxide recycle stream in line 183 may combined with the oxygen stream in line 218 to provide a combined combustion gas stream in line 219. A second portion of the carbon dioxide recycle stream in line 185 is passed to the mixer 196. The combined combustion gas stream in line 219 is passed to the oxidation unit 220'. The first portion of the carbon dioxide recycle stream in line 183 provides sufficient dilution of the oxygen such that the combined combustion gas stream in line 219 to the oxidation unit 220' may comprise between about 15 mol % and about 35 mol % oxygen. In an alternate embodiment, the first portion of the carbon dioxide recycle stream in line 183 and the oxygen stream in line 218 may be passed to the oxidation unit 220' separately. The oxidation unit flue gas stream in line 222' is fed to the carbon dioxide rich flue gas stream in line 132 to provide a mixed stream in line 137. The mixed stream in line 137 is passed to the filter 150. The rest of the embodiment of FIG. 2 operates in the same manner as in FIG. 1.

Figure 3:
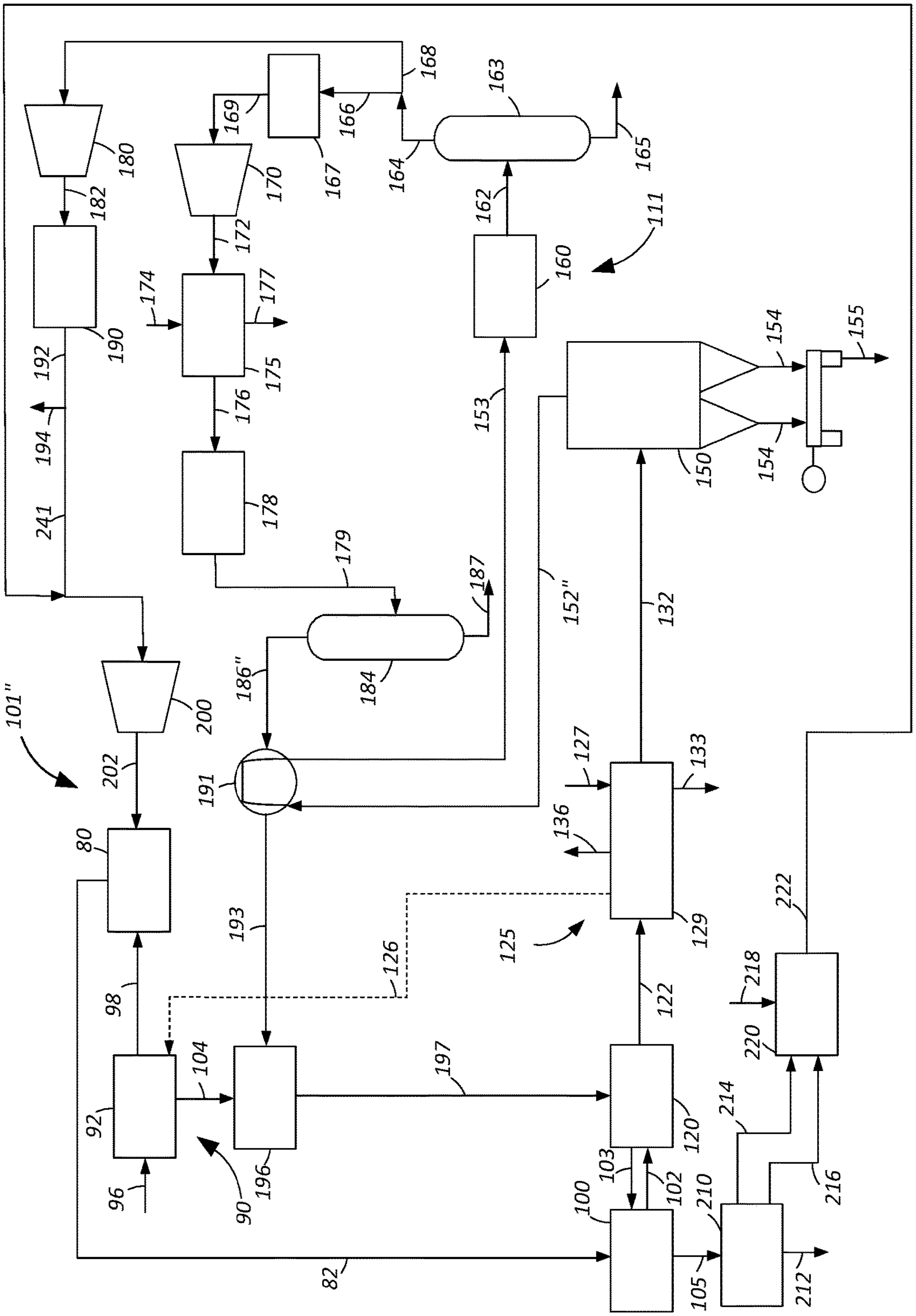
FIG. 3 is a schematic diagram of a process and an apparatus for regenerating catalyst from an MTO unit in accordance with yet another exemplary embodiment of the present disclosure.

Turning now to FIG. 3, another exemplary embodiment of a process and an apparatus for regenerating catalyst from a MTO reactor 100 is addressed with reference to a process and apparatus 101". In the exemplary embodiment shown in FIG. 3, the process and apparatus 101" comprises an additional heat recovery exchanger 191. Many of the elements in FIG. 3 have the same configuration as in FIG. 1 and bear the same reference number. Elements in FIG. 3 that correspond to elements in FIG. 1 but have a different configuration bear the same reference numeral as in FIG. 1 but are marked with a double prime symbol (").

In the embodiment of FIG. 3, the filtered flue gas stream in line 152" is heat exchanged with the carbon dioxide recycle stream in line 186" in a heat exchanger 191 to provide a preheated carbon dioxide recycle stream in line 193 and a partially cooled filtered flue gas stream in line 153. In an exemplary embodiment, the heat exchanger 191 is a gas-to-gas type heat exchanger. The rest of the embodiment of FIG. 3 operates in the same manner as in FIG. 1.

Figure 4:
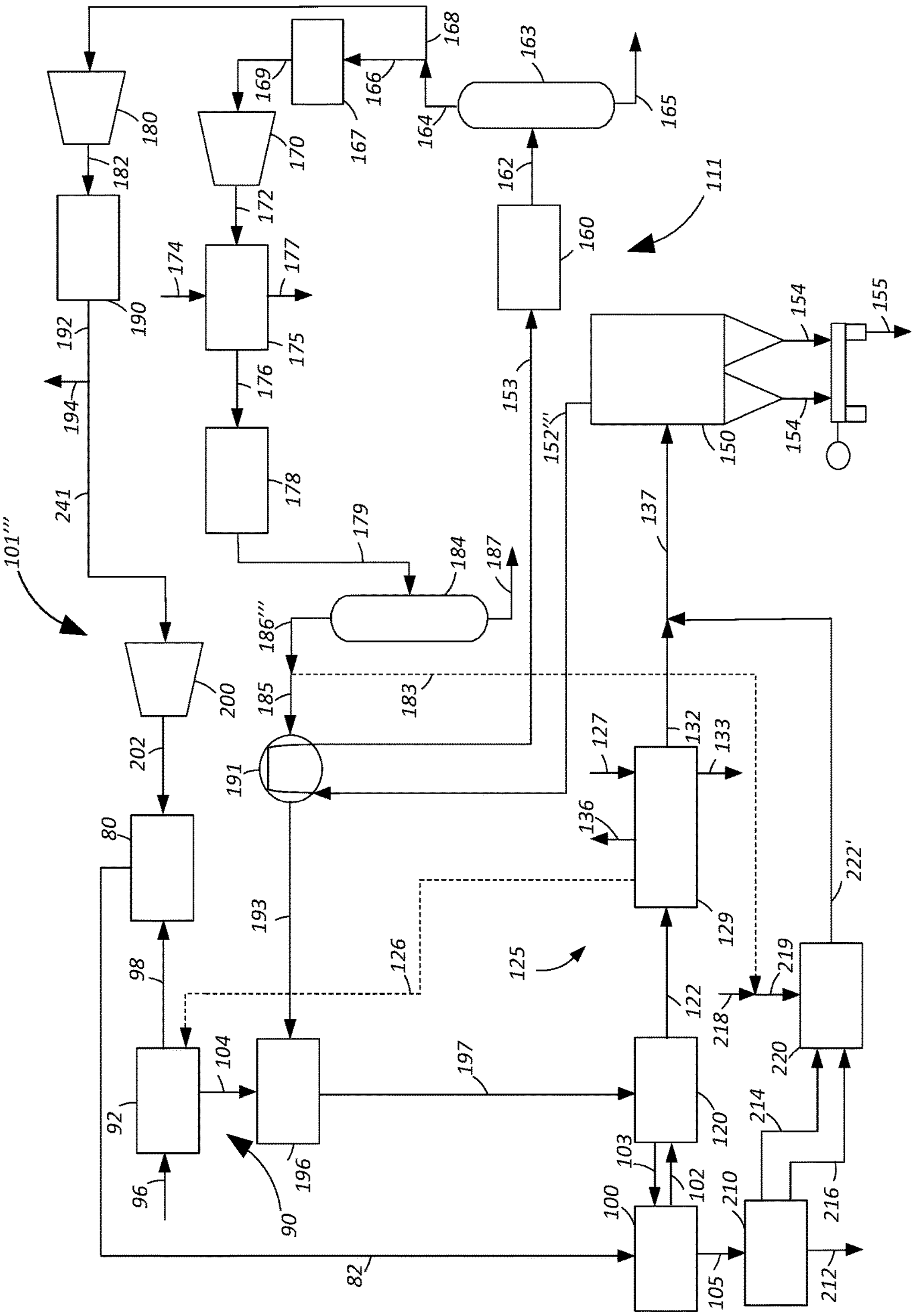
FIG. 4 is a schematic diagram of a process and an apparatus for regenerating catalyst from an MTO unit in accordance with still another exemplary embodiment of the present disclosure.

Turning now to FIG. 4, another exemplary embodiment of a process and an apparatus for regenerating catalyst from a MTO reactor 100 is addressed with reference to a process and apparatus 101'''. Many of the elements in FIG. 4 have the same configuration as in FIG. 2 and bear the same reference number. Elements in FIG. 4 that correspond to elements in FIG. 2 but have a different configuration bear the same reference numeral as in FIG. 2 but are marked with a triple prime symbol (''').

The embodiment of FIG. 4 is the same as FIG. 2 but utilizes the heat exchanger 191 described in FIG. 3. The rest of the embodiment of FIG. 4 operates in the same manner as in FIG. 2.

Figure 5:
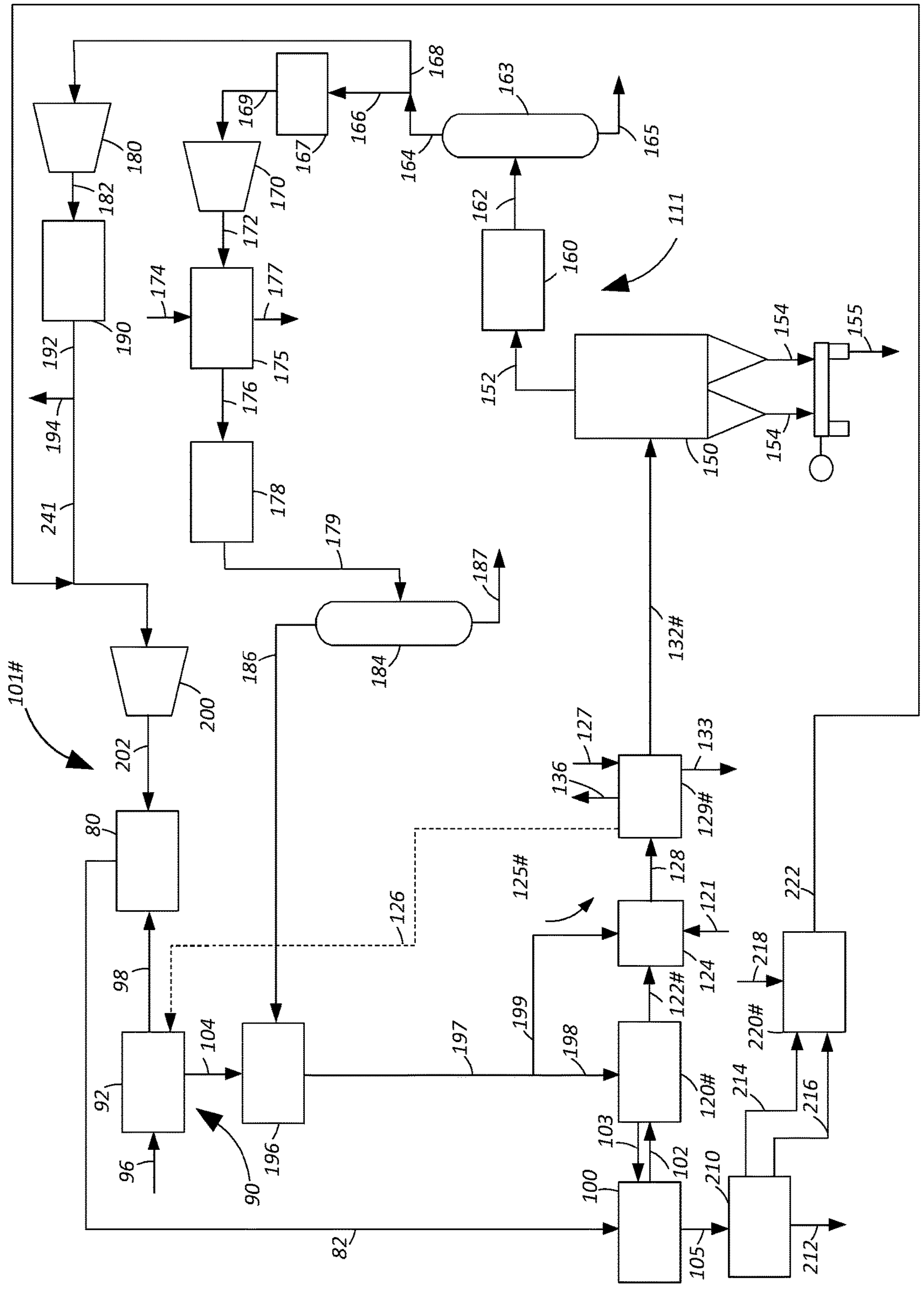
FIG. 5 is a schematic diagram of a process and an apparatus for regenerating catalyst from an MTO unit in accordance with yet another exemplary embodiment of the present disclosure.

Turning now to FIG. 5, another exemplary embodiment of a process and an apparatus 101# for regenerating catalyst from a MTO reactor 100 is addressed. Many of the elements in FIG. 5 have the same configuration as in FIG. 1 and bear the same reference number. Elements in FIG. 5 that correspond to elements in FIG. 1 but have a different configuration bear the same reference numeral as in FIG. 1 but are marked with a hashtag symbol (#).

In the exemplary embodiment as shown in FIG. 5, the MTO regenerator 120# operates under partial burn conditions, the oxidation unit 220# operates in a partial oxidation mode, and a CO combustor is located on the flue gas line 122# from the regenerator 120#. Accordingly, the heat recovery section 125# employs a CO combustor 124 and a HRSG 129#.

When the MTO regenerator 120# is operating under partial burn conditions a portion of the carbon dioxide rich oxidation stream in line 197 is passed to the CO combustor 124 in line 199 to provide an oxidation stream for the CO combustor 124. The carbon dioxide rich oxidation stream in line 197 is separated into a first portion in line 198 and a second portion in line 199. The first portion of the carbon dioxide rich oxidation stream in line 198 is passed to the MTO regenerator 120 and the second portion of the carbon dioxide rich oxidation stream in line 199 is passed to the CO combustor 124 in the heat recovery section 125#.

The carbon dioxide rich oxidation stream in line 198 is passed to the MTO regenerator 120# operating under partial burn conditions. From the MTO regenerator 120, a carbon dioxide rich flue gas stream in line 122# is withdrawn. The carbon dioxide rich flue gas stream in line 122# may have a carbon monoxide concentration of about 0 mol % to about 8 mol %. Under partial burn operation, the carbon dioxide rich flue gas stream in line 122# is sent to a CO combustor 124 in the heat recovery section 125# with a fuel gas stream 121 and the second portion of the carbon dioxide rich oxidation stream in line 199 to oxidize the carbon monoxide present in the carbon dioxide rich flue gas stream in line 122 to carbon dioxide. A fully combusted stream in line 128 from the CO combustor is then sent to the HRSG unit 129# in the heat recovery section 125#. In an exemplary embodiment, the flue gas outlet temperature for the MTO regenerator for a partial combustion or a full combustion MTO regenerator may range from about 625° C. (1157° F.) to about 740° C. (1360° F.) or from about 640° C. (1184° F.) to about 700° C. (1290° F.). The flue gas temperature departing the CO combustor may range from about 890° C. (1630° F.) to about 1040° C. (1900° F.).

The CO combustor 124 can produce a carbon dioxide rich flue gas stream in line 128 that is low in residual oxygen and is therefore advantageous as a feed for methanol synthesis. The CO combustor 124 can also combust a variety of additional waste streams from the complex. In an alternative embodiment, a portion or all of the off-gasses and/or undesirable liquid byproducts in line 214 and a portion or all of the heavy oxygenates in line 216 may be passed to the CO combustor 124 to replace or augment the fuel gas stream in line 121. In a further alternative embodiment, waste gas, such as hydrogen, carbon monoxide, and dimethyl ether, and waste liquid products, such as fusel oil, that are produced in the methanol synthesis unit 80 may be directed to the CO combustor 124 in a similar fashion.

In one embodiment, the CO combustor 124 may operate at a pressure between about atmospheric pressure and 35 kPa(g) (5 psig), which depends on the back pressure to the filter 150. In an alternative embodiment, the CO combustor 124 may operate at a pressure between about 70 kPa(g) (10 psig) and about 350 kPa(g) (50 psig) based on the operating pressure or the regenerator 120. It would be advantageous to operate the CO combustor 124 at a higher pressure to reduce the power required in the downstream carbon dioxide recycle compressor 170 and methanol carbon dioxide compressor 180.

The carbon dioxide rich flue gas stream in line 128 is passed to the superheated steam section of the HRSG 129# to transfer heat to a saturated steam stream and produce a superheated steam stream in line 126 and a partially cooled carbon dioxide rich flue gas stream. The partially cooled carbon dioxide rich flue gas stream is then heat exchanged with a boiler feed water stream in line 127 to cool the partially cooled carbon dioxide rich flue gas stream in a saturated steam section to produce the saturated steam stream and a cooled carbon dioxide rich flue gas stream in line 132#. A blowdown stream in line 133 is also withdrawn from the saturated steam section. A portion of the saturated steam stream may be superheated in the superheated steam section while the remainder saturated steam stream in line 136 can be sent to other parts of the process and apparatus for use as needed. The partially cooled carbon dioxide rich flue gas stream in line 132# is withdrawn from the saturated steam section of the HRSG 129# and passed to the filter 150. The rest of the process is the same as described in FIG. 1.

Figure 6:
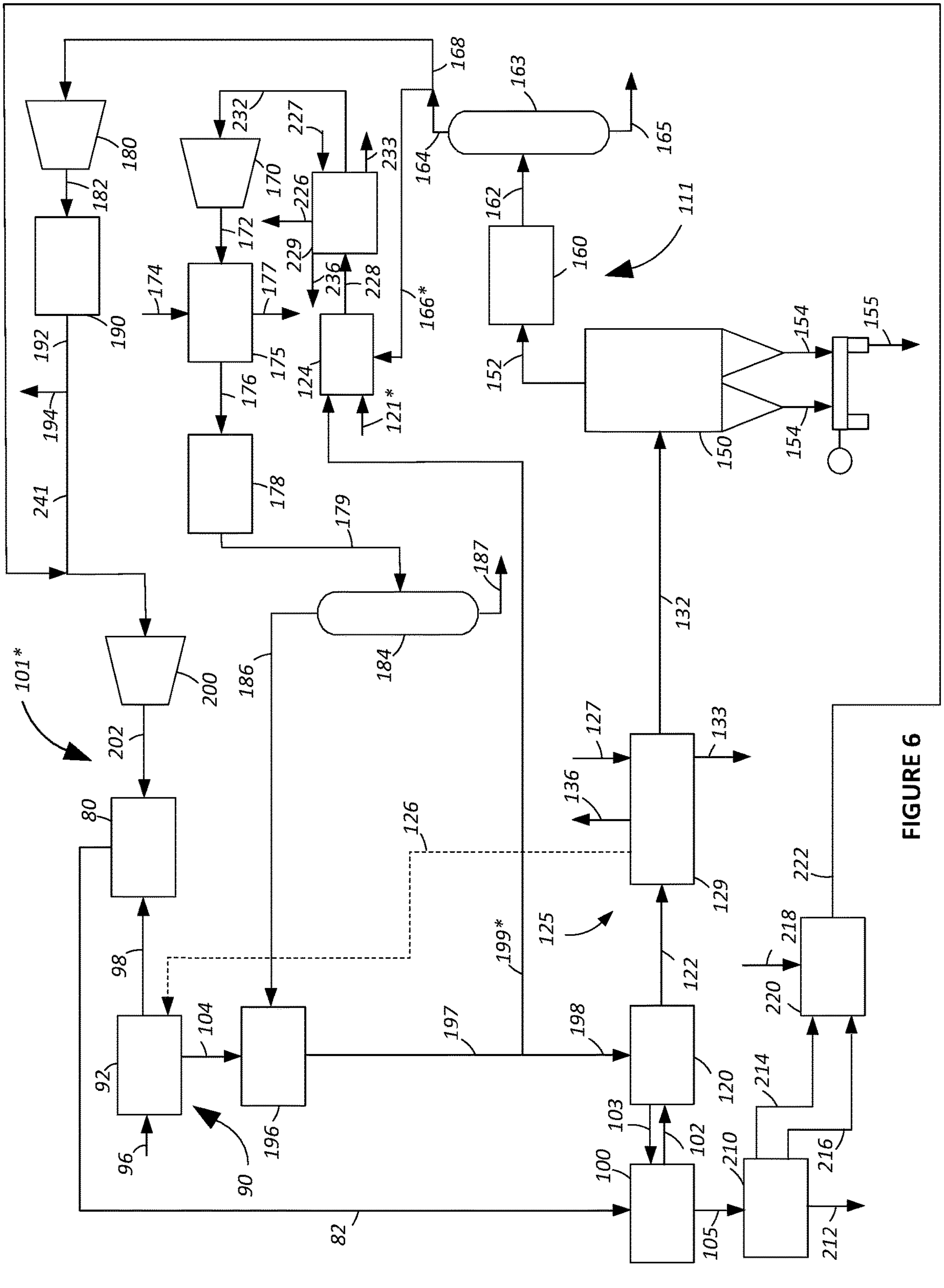
FIG. 6 is a schematic diagram of a process and an apparatus for regenerating catalyst from an MTO unit in accordance with still another exemplary embodiment of the present disclosure.

Yet another exemplary embodiment of a process and an apparatus 101* for regenerating catalyst from an MTO reactor is depicted in FIG. 6. In the exemplary embodiment as shown in FIG. 6, the regenerator 120 operates in partial combustion mode and the oxidation unit 220 operates in partial oxidation mode. As shown in FIG. 6, a CO combustor 124 is located downstream of carbon dioxide separation unit 111. Many of the elements in FIG. 6 have the same configuration as in FIG. 1 and bear the same reference number. Elements in FIG. 6 that correspond to elements in FIG. 1 but have a different configuration bear the same reference numeral as in FIG. 1 but are marked with an asterisk symbol (*).

In the embodiment of FIG. 6, a CO combustor 124 is located downstream of the first KOD 163 in downstream communication with the overhead line 164 thereof and the carbon dioxide recycle line 166* and replaces the heater 167.

When the MTO regenerator 120 is operating under partial burn conditions, a portion of the carbon dioxide rich oxidation stream in line 197 is passed to the CO combustor in line 199 to prevent nitrogen build up in the flue gas stream. The carbon dioxide rich oxidation stream in line 197 is separated into a first portion in line 198 and a second portion in line 199*. The first portion of the carbon dioxide rich oxidation stream in line 198 is passed to the MTO regenerator 120 and the second portion of the carbon dioxide rich oxidation stream in line 199* is passed to the CO combustor 124 downstream of the first KOD 163 in the carbon dioxide separation unit 111.

The carbon dioxide rich oxidation stream in line 198 is passed to the MTO regenerator 120 operating under partial burn conditions. From the MTO regenerator 120, a carbon dioxide rich flue gas stream in line 122 is withdrawn. The carbon dioxide rich flue gas stream in line 122 is concentrated in carbon monoxide. The recycle carbon dioxide rich flue gas stream in line 166* is sent to a CO combustor 124 with a fuel gas stream in line 121* and the second portion of the carbon dioxide rich oxidation stream in line 199* to oxidize the carbon monoxide present in the recycle carbon dioxide rich flue gas stream in line 166* to carbon dioxide. A fully combusted stream in line 228 from the CO combustor 124* may emerge in line 228. The flue gas temperature departing the CO combustor 124* in line 228 may range from about 890 to about 1040° C.

The carbon dioxide rich flue gas stream in line 228 may then be passed to the superheated steam section of a second HRSG 229 to transfer heat to a saturated steam stream and produce a superheated steam stream in line 226 and a partially cooled carbon dioxide rich flue gas stream. The partially cooled carbon dioxide rich flue gas stream is then heat exchanged with a boiler feed water stream in line 227 to cool the partially cooled carbon dioxide rich flue gas stream in a saturated steam section to produce the saturated steam stream and a cooled recycle carbon dioxide rich flue gas stream in line 232. A condensate stream in line 233 is also withdrawn from the saturated steam section. A portion of the saturated steam stream may be superheated in the superheated steam section while the remainder saturated steam stream in line 236 can be sent to other parts of the process and apparatus 101* for use as needed. The partially cooled carbon dioxide rich flue gas stream in line 232 is withdrawn from the saturated steam section of the second HRSG 229, compressed in the carbon dioxide recycle compressor 170 and then may be used to generate additional steam in the steam generator 175. The rest of the process is the same as described in FIG. 1.

It is beneficial to the overall economics of the process to maximize the carbon monoxide concentration of the carbon dioxide rich flue gas stream in line 122 and minimize the amount of oxygen. This will reduce the amount of hydrogen required by the methanol synthesis unit 80 to produce the same amount of methanol and will generate more steam, reducing overall utility consumption.

Figure 7:
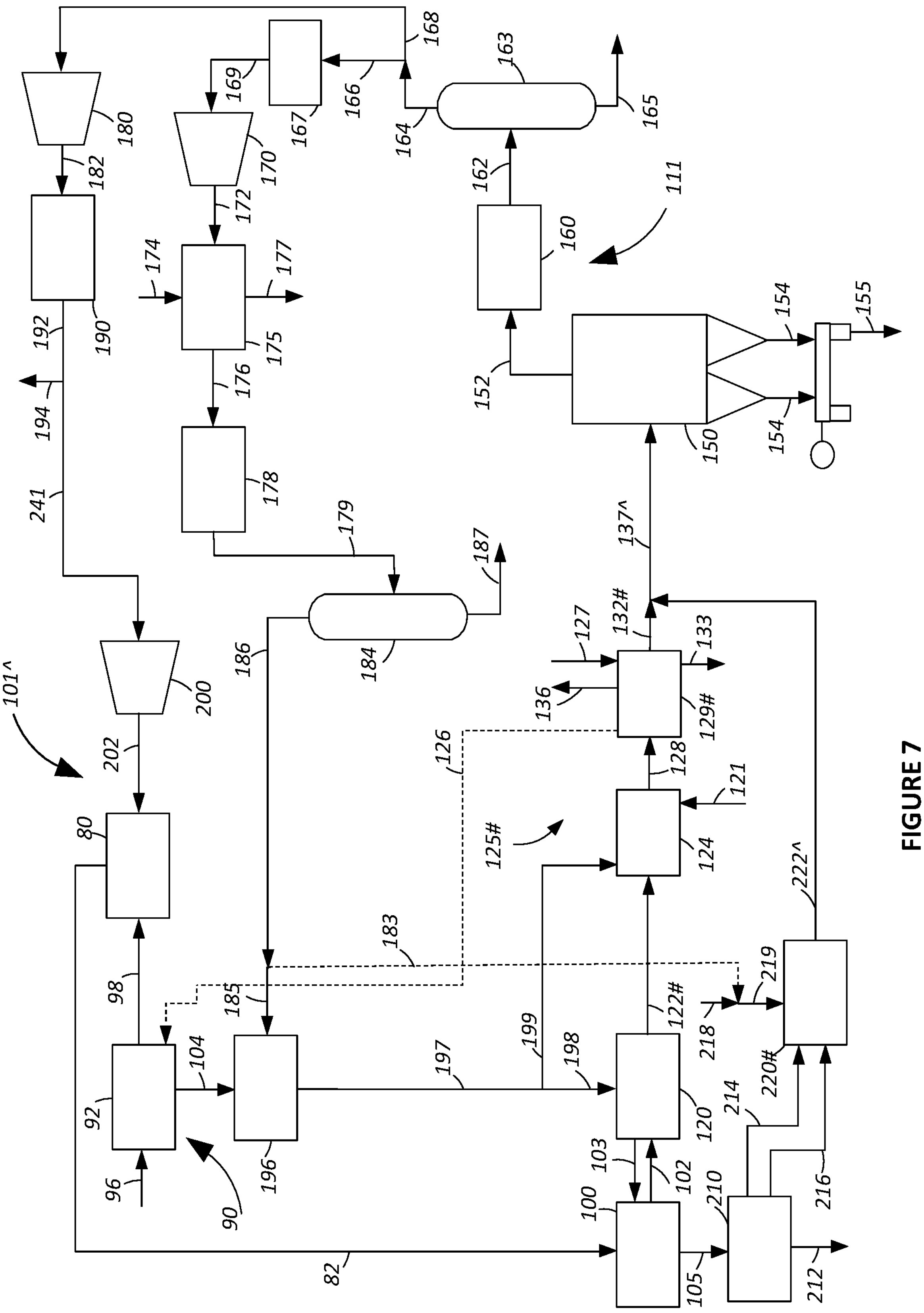
FIG. 7 is a schematic diagram of a process and an apparatus for regenerating catalyst from an MTO unit in accordance with yet another exemplary embodiment of the present disclosure.

A further exemplary embodiment of a process and an apparatus 101^ for regenerating catalyst from an MTO reactor 100 is depicted in FIG. 7. In the exemplary embodiment as shown in FIG. 7, the regenerator 120 operates in partial combustion and the oxidation unit 220^ operates in full oxidation mode. Many of the elements in FIG. 7 have the same configuration as in FIG. 5 and bear the same reference number. Elements in FIG. 7 that correspond to elements in FIG. 5 but have a different configuration bear the same reference numeral as in FIG. 5 but are marked with a carat symbol (^).

As shown in FIG. 7, a CO combustor 124 is in the heat recovery section 125#, but the oxidation unit 220# is run in full oxidation mode. The oxidation unit 220# may be a fired heater that provides various heater duties in the complex. As shown in FIG. 7, a portion of the carbon dioxide recycle stream may be taken as a first portion stream in line 183 and passed to the oxidation unit 220#. The first portion of the carbon dioxide recycle stream in line 183 may be combined with the oxygen stream in line 218 to provide a combined combustion gas stream in line 219. A second portion of the carbon dioxide recycle stream in line 185 is passed to the mixer 196. The combined combustion gas stream in line 219 is passed to the oxidation unit 220#. The first portion of the carbon dioxide recycle stream in line 183 provides sufficient dilution of the oxygen such that the combined combustion gas stream in line 219 to the oxidation unit 220# may comprise between about 15 mol % and about 35 mol % oxygen. In an alternate embodiment, the first portion of the carbon dioxide recycle stream in line 183 and the oxygen stream in line 218 may be passed to the oxidation unit 220# separately.

In the embodiment of FIG. 7, the oxidation stream in line 222^ is mixed with the cooled carbon dioxide rich flue gas stream in line 132# to provide a mixed stream in line 137^. The mixed stream in line 137^ is passed to the filter 150. The rest of the embodiment of FIG. 7 is the same as FIG. 5.

Figure 8:
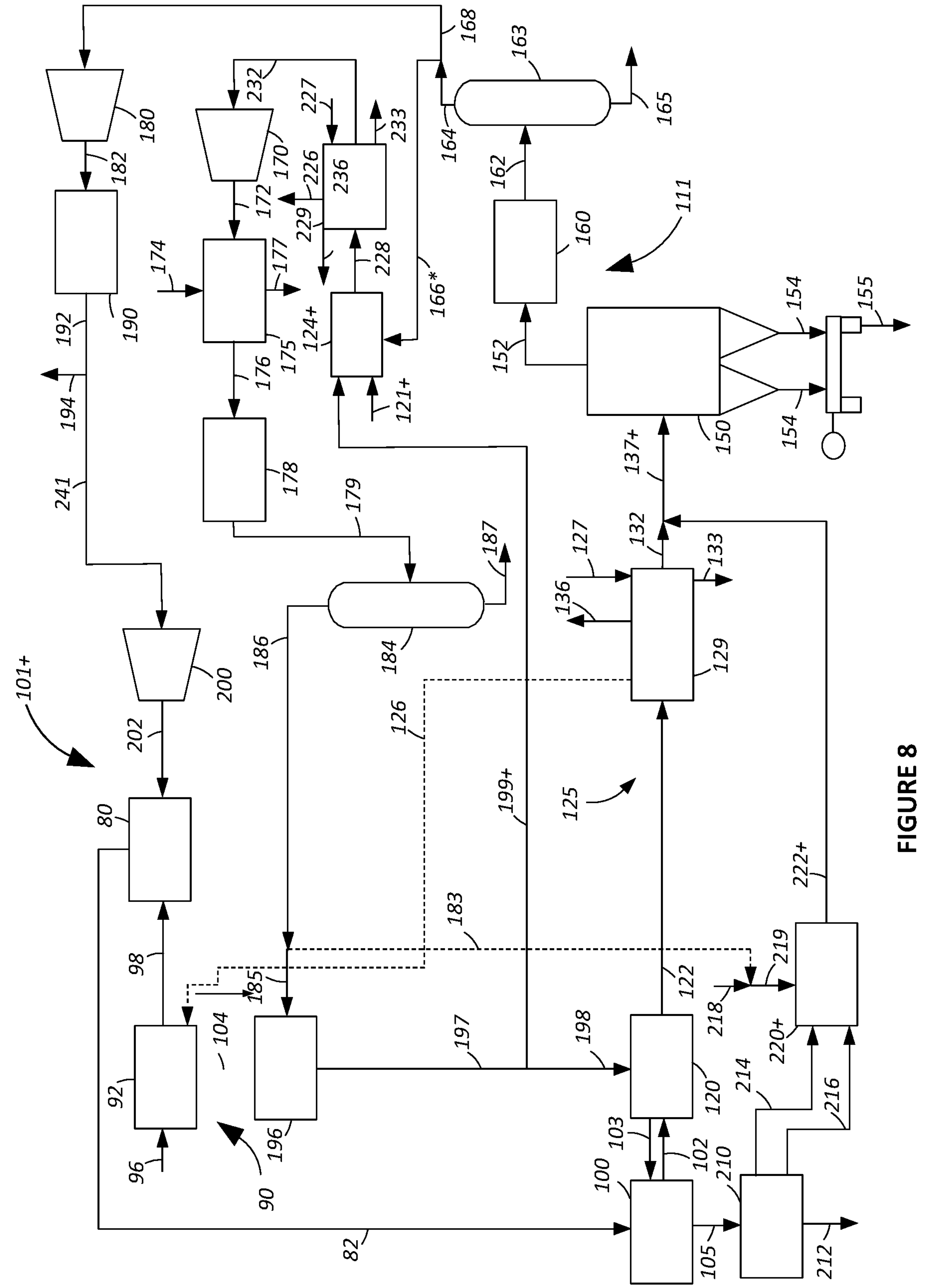
FIG. 8 is a schematic diagram of a process and an apparatus for regenerating catalyst from an MTO unit in accordance with still another exemplary embodiment of the present disclosure.

An additional, exemplary embodiment of a process and an apparatus 101+ for regenerating catalyst from an MTO reactor 100 is depicted in FIG. 8. In the exemplary embodiment shown in FIG. 8, the regenerator 120 operates in partial combustion and the oxidation unit 220+ operates in full oxidation mode. Many of the elements in FIG. 8 have the same configuration as in FIG. 6 and bear the same reference number. Elements in FIG. 8 that correspond to elements in FIG. 6 but have a different configuration bear the same reference numeral as in FIG. 6 but are marked with a cross symbol (+).

As shown in FIG. 8, a CO combustor 124+ is located downstream of water removal section, but the oxidation unit 220+ is run in full oxidation mode and may be a fired heater. As shown in FIG. 8, a portion of the carbon dioxide recycle stream may be taken as a first portion stream in line 183 and passed to the oxidation unit 220+. The first portion of the carbon dioxide recycle stream in line 183 may be combined with the oxygen stream in line 218 to provide a combined combustion gas stream in line 219. A second portion of the carbon dioxide recycle stream in line 185 is passed to the mixer 196. The combined combustion gas stream in line 219 is passed to the oxidation unit 220+. The first portion of the carbon dioxide recycle stream in line 183 provides sufficient dilution of the oxygen such that the combined combustion gas stream in line 219 to the oxidation unit 220+ may comprise between about 15 mol % and about 35 mol % oxygen. In an alternate embodiment, the first portion of the carbon dioxide recycle stream in line 183 and the oxygen stream in line 218 may be passed to the oxidation unit 220+ separately.

In the embodiment of FIG. 8, the oxidation stream in line 222+ is mixed with the cooled carbon dioxide rich flue gas stream in line 132 to provide a mixed stream in line 137+ which is passed to the filter 150. Other locations may be appropriate for inputting the oxidation stream in line 222+. The rest of the embodiment of FIG. 8 is the same as FIG. 6.

Figure 9:
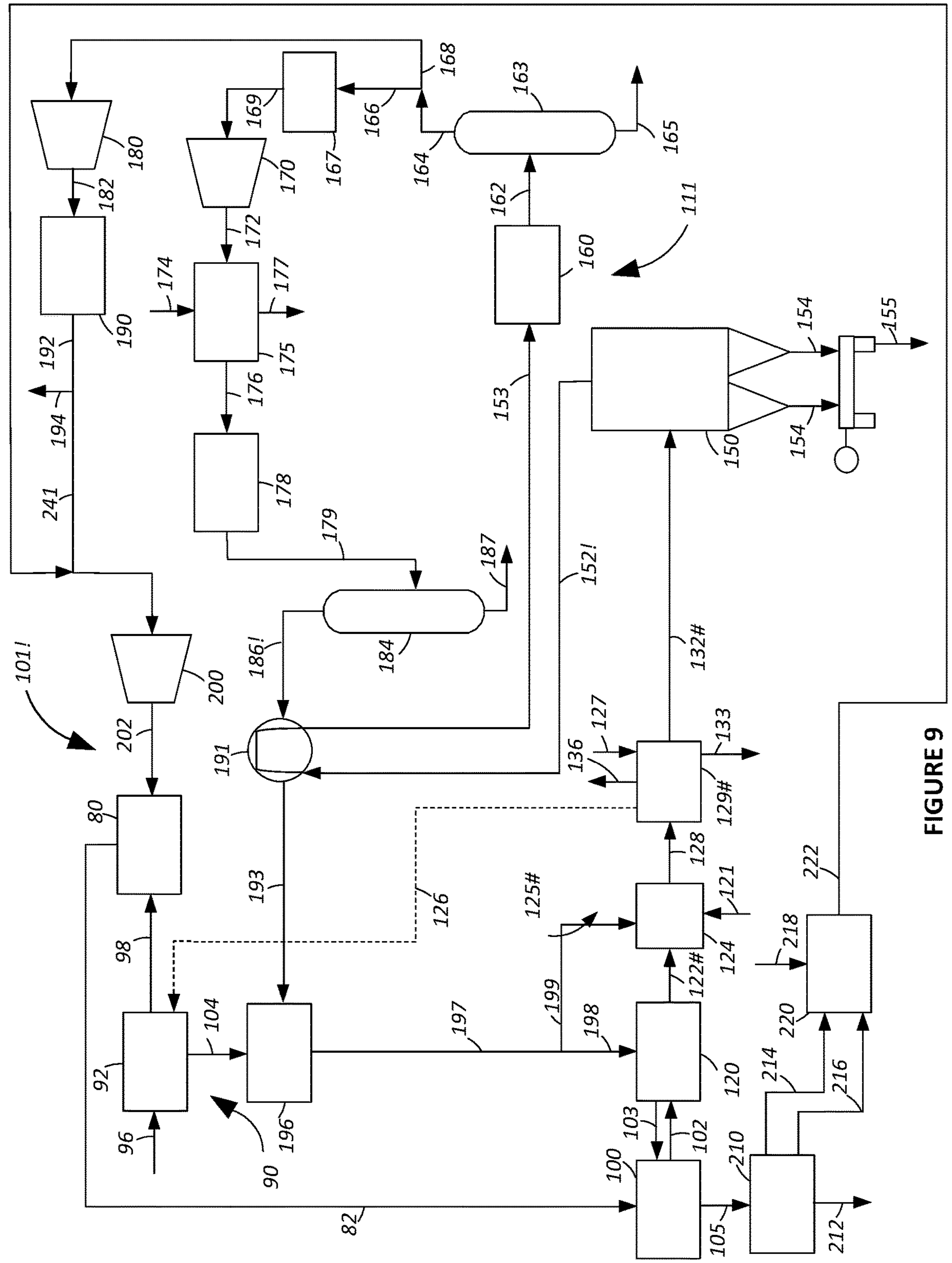
FIG. 9 is a schematic diagram of a process and an apparatus for regenerating catalyst from an MTO unit in accordance with yet another exemplary embodiment of the present disclosure.

An even further, exemplary embodiment of a process and an apparatus 101! for regenerating catalyst from an MTO reactor 100 is depicted in FIG. 9. Many of the elements in FIG. 9 have the same configuration as in FIG. 5 and bear the same reference number. Elements in FIG. 9 that correspond to elements in FIG. 5 but have a different configuration bear the same reference numeral as in FIG. 5 but are marked with an exclamation point (!).

In the exemplary embodiment shown in FIG. 9, the regenerator 120 operates in partial combustion and the oxidation unit 220 operates in a partial oxidation mode. As shown in FIG. 9, a CO combustor 124 is employed in the heat recovery section 125#, but the filtered flue gas stream in line 152! is heat exchanged with the carbon dioxide recycle stream in line 186! in the heat exchanger 191 to provide a preheated carbon dioxide recycle stream in line 193 and a partially cooled filtered flue gas stream in line 153. In an exemplary embodiment, the heat exchanger 191 is a gas-to-gas type heat exchanger. The rest of the embodiment of FIG. 9 operates in the same manner as in FIG. 5.

Figure 10:
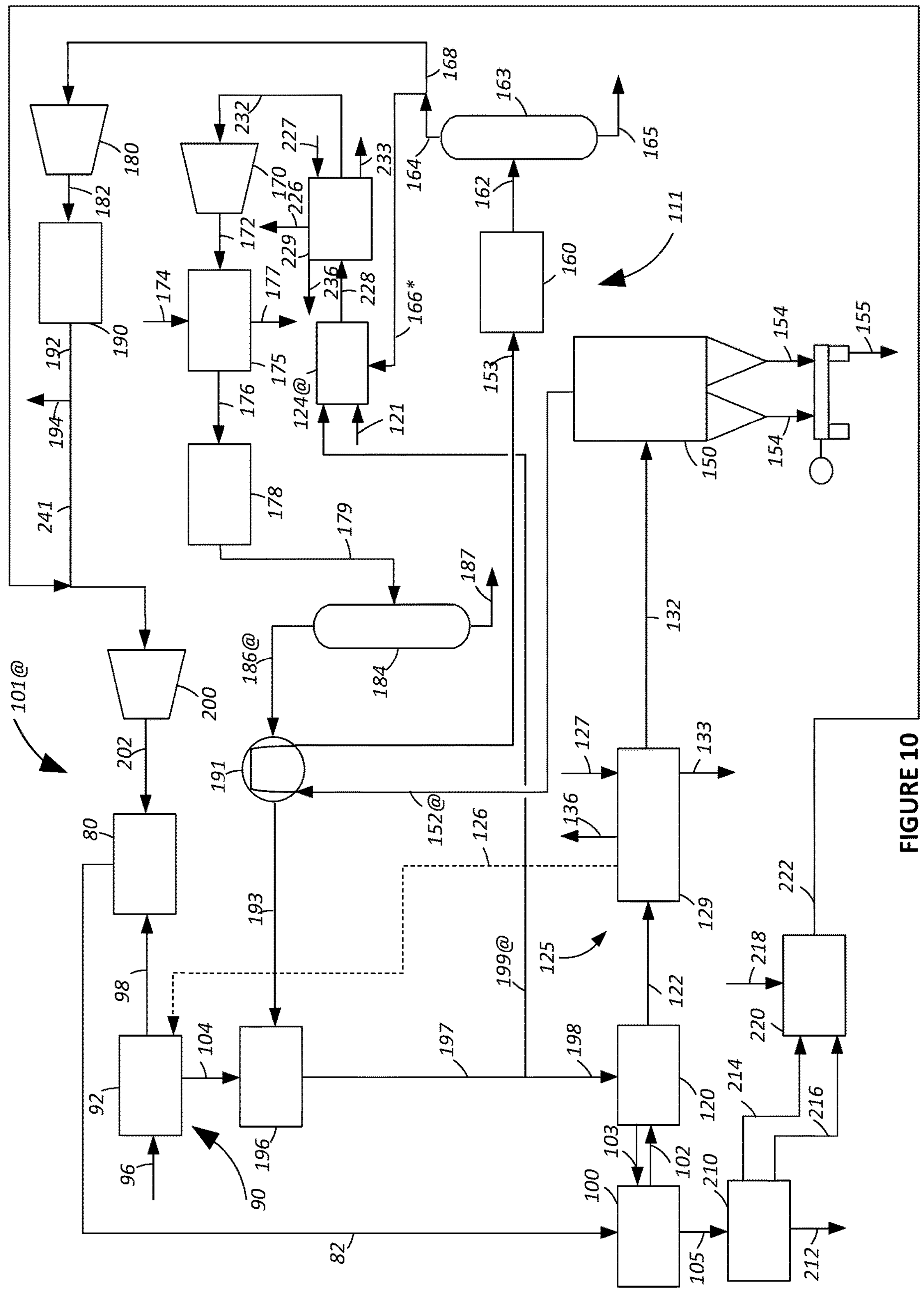
FIG. 10 is a schematic diagram of a process and an apparatus for regenerating catalyst from an MTO unit in accordance with still another exemplary embodiment of the present disclosure.

An even additional, exemplary embodiment of a process and an apparatus 101@ for regenerating catalyst from an MTO reactor 100 is depicted in FIG. 10. Many of the elements in FIG. 10 have the same configuration as in FIG. 6 and bear the same reference number. Elements in FIG. 10 that correspond to elements in FIG. 6 but have a different configuration bear the same reference numeral as in FIG. 6 but are marked with an at symbol (@).

In the exemplary embodiment shown in FIG. 10, the regenerator 120 operates in partial combustion and the oxidation unit 220 operates in a partial oxidation mode. As shown in FIG. 10, a CO combustor 124@ is employed downstream of water removal, but the filtered flue gas stream in line 152@ is heat exchanged with the carbon dioxide recycle stream in line 186@ in the heat exchanger 191 to provide a preheated carbon dioxide recycle stream in line 193 and a partially cooled filtered flue gas stream in line 153. The rest of the embodiment of FIG. 10 operates in the same manner as in FIG. 6.

Figure 11:
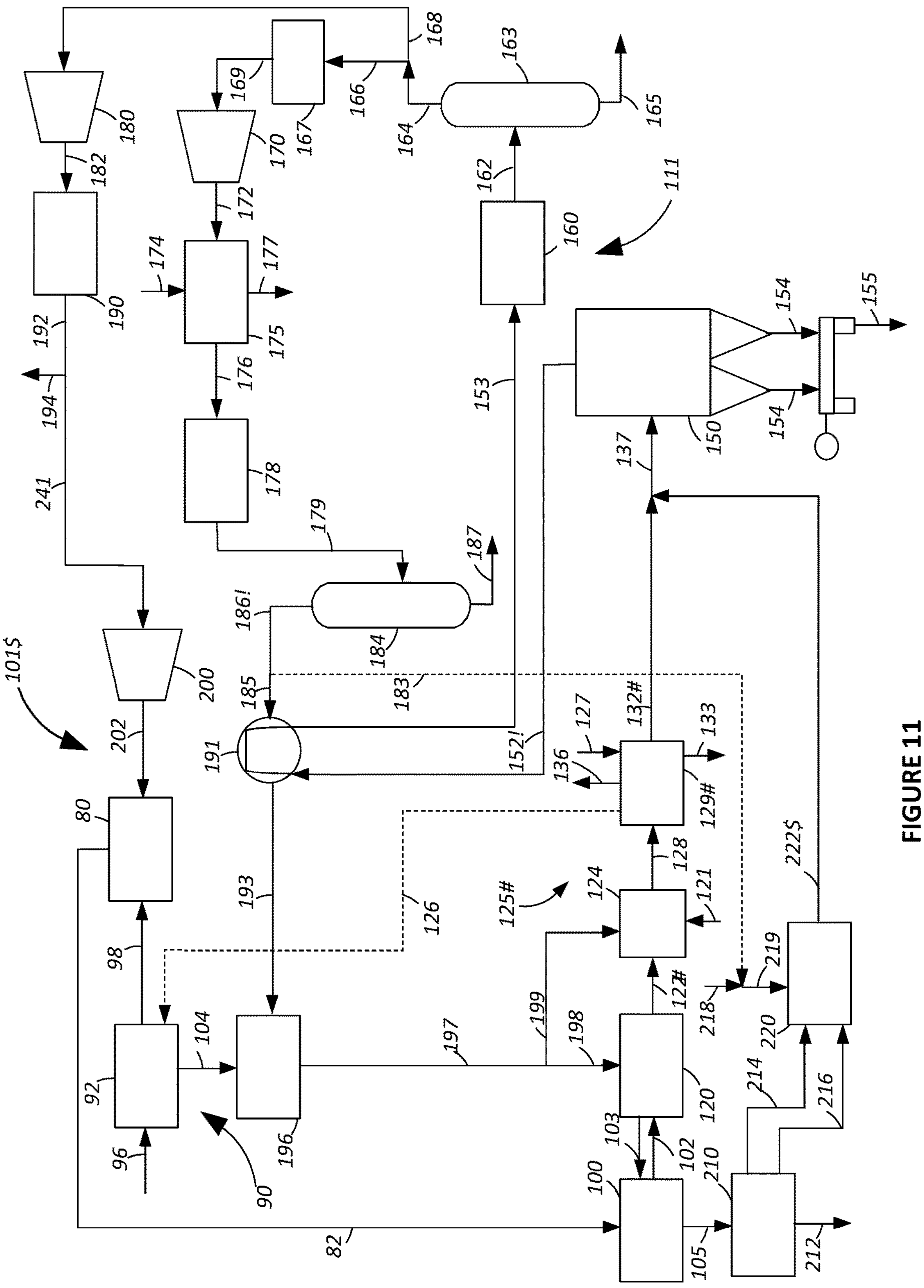
FIG. 11 is a schematic diagram of a process and an apparatus for regenerating catalyst from an MTO unit in accordance with yet another exemplary embodiment of the present disclosure.

A still further, exemplary embodiment of a process and an apparatus 101$ for regenerating catalyst from an MTO reactor 100 is depicted in FIG. 11. Many of the elements in FIG. 11 have the same configuration as in FIG. 9 and bear the same reference number. Elements in FIG. 11 that correspond to elements in FIG. 9 but have a different configuration bear the same reference numeral as in FIG. 9 but are marked with a dollar sign ($).

In the exemplary embodiment shown in FIG. 11, the regenerator 120 operates in partial combustion and the oxidation unit 220 operates in a full oxidation mode. As shown in FIG. 11, a CO combustor 124 is employed in the heat recovery section 125#, the filtered flue gas stream in line 152! is heat exchanged with the carbon dioxide recycle stream in line 186! in the heat exchanger 191 to provide a preheated carbon dioxide recycle stream in line 193 and a partially cooled filtered flue gas stream in line 153, but the oxidation unit 220 is operated in full oxidation mode. The oxidation unit 220 may be a fired heater that provides various heater duties in the complex. As shown in FIG. 11, a portion of the carbon dioxide recycle stream in line 186! may be taken as a first portion stream in line 183 and passed to the oxidation unit 220. The first portion of the carbon dioxide recycle stream in line 183 may be combined with the oxygen stream in line 218 to provide a combined combustion gas stream in line 219. A second portion of the carbon dioxide recycle stream in line 185 is passed to the mixer 196 in line 193 after heat exchange in the heat exchanger 191. The combined combustion gas stream in line 219 is passed to the oxidation unit 220. The first portion of the carbon dioxide recycle stream in line 183 provides sufficient dilution of the oxygen such that the combined combustion gas stream in line 219 to the oxidation unit 220 may comprise between about 15 mol % and about 35 mol % oxygen. In an alternate embodiment, the first portion of the carbon dioxide recycle stream in line 183 and the oxygen stream in line 218 may be passed to the oxidation unit 220 separately. In the embodiment of FIG. 11, the oxidation stream in line 222$ is mixed with the cooled carbon dioxide rich flue gas stream in line 132# to provide a mixed stream in line 137 which is passed to the filter 150. The rest of the embodiment of FIG. 11 is the same as FIG. 9.

Figure 12:
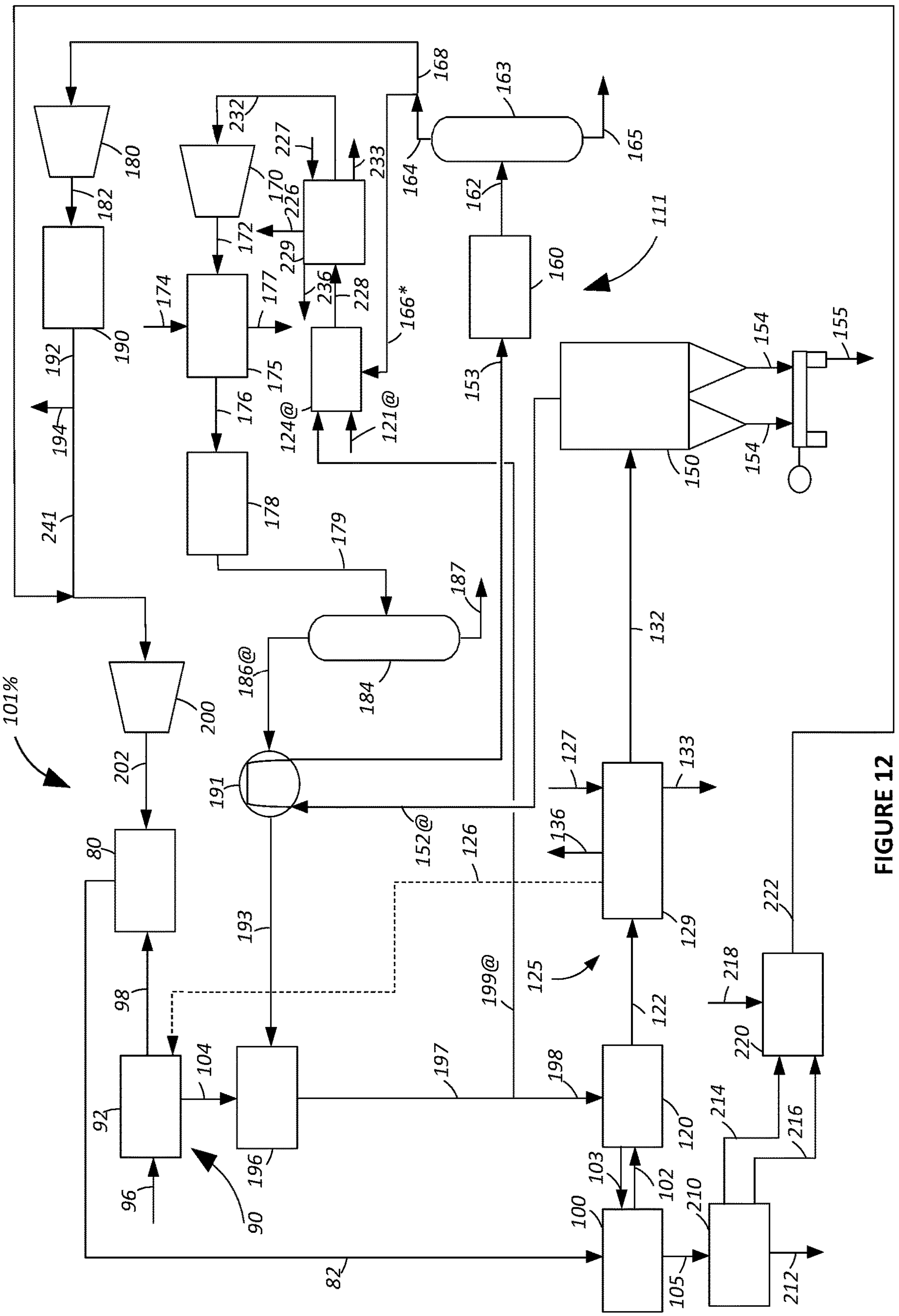
FIG. 12 is a schematic diagram of a process and an apparatus for regenerating catalyst from an MTO unit in accordance with still another exemplary embodiment of the present disclosure.

A still, even additional, exemplary embodiment of a process and an apparatus 101% for regenerating catalyst from an MTO reactor 100 is depicted in FIG. 12. Many of the elements in FIG. 12 have the same configuration as in FIG. 10 and bear the same reference number. Elements in FIG. 12 that correspond to elements in FIG. 10 but have a different configuration bear the same reference numeral as in FIG. 12 but are marked with a per-cent sign (%).

In the exemplary embodiment shown in FIG. 12, the regenerator 120 operates in partial combustion and the oxidation unit 220 operates in full oxidation mode. As shown in FIG. 12, a CO combustor 124@ is employed downstream of water removal, but the filtered flue gas stream in line 152@ is heat exchanged with the carbon dioxide recycle stream in line 186@ in the heat exchanger 191 to provide a preheated carbon dioxide recycle stream in line 193 and a partially cooled filtered flue gas stream in line 153. The oxidation unit 220 is operated in full oxidation mode. The rest of the embodiment of FIG. 12 operates in the same manner as in FIG. 10.

As a result of charging more mass of inert gas in the MTO regenerator 120 due to the molecular weight increase of carbon dioxide over air, which is mostly nitrogen, in order to maintain the same volumetric flow rates as in the base case, the temperature in the regenerator unit 120 may drop. In order to keep the regenerator temperature constant, the following measures may be used: a) installing electric heating coils in the regenerator and using electricity generated within the process or from any source; or b) installing electric heater to further heat the preheated carbon dioxide recycle stream in line 194 and using electricity generated within the process or from any source; or c) firing fuel gas and/or natural gas directly in the regenerator; or d) continuously firing a direct fired air heater; or e) firing torch oil and/or slurry oil in the MTO regenerator 120; or f) attenuation of the catalyst cooler duties in the MTO regenerator 120. Use of electricity for heating coils in the regenerator unit is a more sustainable and environmentally friendly measure. The present process includes using the electricity generated from the MTO process as disclosed above as a source of heat for the heating coils in the regenerator unit 120. Alternatively, heat and/or electricity from any suitable renewable energy source or a fuel gas stream may also be used in the regenerator unit 120.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect. Further, the figure may include one or more exemplary sensors located on one or more conduits. Nevertheless, there may be sensors present on every stream so that the corresponding parameter (s) can be controlled accordingly.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLE

We simulated the disclosed process of an MTO unit that processes 2000 metric tons per day of methanol and determined carbon dioxide flow rates to units shown in the Table.

TABLE

| Carbon Dioxide Stream | Flow Rate (lb/hr) |
|---|---|
| To Regenerator | 31080 |
| To CO Boiler | 22587 |
| To Methanol Synthesis Unit | 69519 |
| Net Carbon Dioxide | 10843 |

The net carbon dioxide stream represents the incremental carbon dioxide produced in the regenerator from burning coke and the CO boiler from combusting CO to $CO_2$ that can be charged to methanol synthesis. This incremental carbon dioxide would not be available in the conventional case in which air is used for CO boiler and regeneration gas. In the conventional case, the carbon dioxide would be dilute in nitrogen and be too economically difficult to recover. The incremental carbon dioxide can be used to produce an additional 8810 lb/hour methanol.

Specific Embodiments

While the following is described in conjunction with specific embodiments, it will be understood that this description is intended to illustrate and not limit the scope of the preceding description and the appended claims.

A first embodiment of the present disclosure is a process for regenerating catalyst from a MTO process comprising providing an oxygen stream and a carbon dioxide recycle stream; mixing the oxygen stream and the carbon dioxide recycle stream to provide a carbon dioxide rich oxidation stream; passing the carbon dioxide rich oxidation stream to a regenerator unit to provide a carbon dioxide rich flue gas stream; filtering the carbon dioxide rich flue gas stream to remove catalyst fines and produce a filtered flue gas stream; separating the filtered flue gas stream to provide the carbon dioxide recycle stream and a carbon dioxide stream for methanol synthesis. An embodiment of the present disclosure is one, any or all of prior embodiments in this paragraph up through the first embodiment in this paragraph further comprising pre-heating the carbon dioxide recycle stream by heat exchange with the filtered flue gas stream to provide a preheated carbon dioxide recycle stream; and mixing the preheated carbon dioxide recycle stream and the oxygen stream to provide the carbon dioxide rich oxidation stream. An embodiment of the present disclosure is one, any or all of prior embodiments in this paragraph up through the first embodiment in this paragraph further comprising partially removing water from the filtered flue gas stream to produce a partially dehydrated flue gas stream; separating the partially dehydrated flue gas stream to provide the carbon dioxide recycle stream and the carbon dioxide stream for methanol synthesis; and passing the carbon dioxide stream for methanol synthesis to a methanol synthesis unit. An embodiment of the present disclosure is one, any or all of prior embodiments in this paragraph up through the first embodiment in this paragraph further comprising passing the carbon dioxide stream for methanol synthesis to a contaminant removal unit; removing oxygen and optionally water from the carbon dioxide stream for methanol synthesis in the contaminant removal unit to produce a treated carbon dioxide stream; and passing the treated carbon dioxide stream to the methanol synthesis unit to produce a methanol stream. An embodiment of the present disclosure is one, any or all of prior embodiments in this paragraph up through the first embodiment in this paragraph wherein the methanol synthesis unit comprises a reverse water gas shift section and a methanol converter section. An embodiment of the present disclosure is one, any or all of prior embodiments in this paragraph up through the first embodiment in this paragraph wherein the methanol synthesis unit comprises a direct carbon dioxide hydrogenation section. An embodiment of the present disclosure is one, any or all of prior embodiments in this paragraph up through the first embodiment in this paragraph wherein the methanol synthesis unit comprises a dry methane reforming section. An embodiment of the present disclosure is one, any or all of prior embodiments in this paragraph up through the first embodiment in this paragraph wherein the carbon dioxide rich oxidation stream comprises an oxygen concentration of no more than 35 mole %. An embodiment of the present disclosure is one, any or all of prior embodiments in this paragraph up through the first embodiment in this paragraph wherein the oxygen stream is provided from an electrolyzer or an air separation unit. An embodiment of the present disclosure is one, any or all of prior embodiments in this paragraph up through the first embodiment in this paragraph further comprising transferring heat from the carbon dioxide rich flue gas stream to a boiler feed water stream in a heat recovery section to form a partially cooled carbon dioxide rich flue gas stream and a steam stream. An embodiment of the present disclosure is one, any or all of prior embodiments in this paragraph up through the first embodiment in this paragraph, wherein the heat recovery section is a heat recovery steam generator (HRSG) comprising transferring heat from the carbon dioxide rich flue gas stream to a boiler feed water stream in the HRSG to form the partially cooled carbon dioxide rich flue gas stream and the steam stream; and filtering the partially cooled carbon dioxide rich flue gas stream to produce the filtered flue gas stream. An embodiment of the present disclosure is one, any or all of prior embodiments in this paragraph up through the first embodiment in this paragraph further comprising separating the carbon dioxide rich oxidation stream into a first portion and a second portion; passing the first portion of carbon dioxide rich oxidation stream to the regenerator unit; and passing the second portion of carbon dioxide rich oxidation stream to a CO combustor in the heat recovery section. An embodiment of the present disclosure is one, any or all of prior embodiments in this paragraph up through the first embodiment in this paragraph wherein the MTO process utilizes a SAPO catalyst. An embodiment of the present disclosure is one, any or all of prior embodiments in this paragraph up through the first embodiment in this paragraph further comprising passing the carbon dioxide rich flue gas stream to a third stage separator (TSS) to separate catalyst fines to an underflow stream and provide a carbon dioxide rich flue gas stream with reduced catalyst fines in an overflow stream; generating electricity from the overflow stream in an expander; and passing the overflow stream to the heat recovery section. An embodiment of the present disclosure is one, any or all of prior embodiments in this paragraph up through the first embodiment in this paragraph further comprising cooling the filtered flue gas stream to provide a cooled filtered flue gas stream; separating water from the cooled filtered flue gas stream to provide a dry flue gas stream; and separating the dry flue gas stream to provide the carbon dioxide recycle stream and the carbon dioxide stream for methanol synthesis. An embodiment of the present disclosure is one, any or all of prior embodiments in this paragraph up through the first embodiment in this paragraph further comprising compressing the carbon dioxide recycle stream to provide a compressed carbon dioxide recycle stream; optionally passing the compressed carbon dioxide recycle stream to a low-pressure steam generator to provide a low-pressure steam stream and a partially cooled carbon dioxide recycle stream; optionally cooling the partially cooled carbon dioxide recycle stream to provide a cooled carbon dioxide recycle stream; optionally separating water from the cooled carbon dioxide recycle stream to provide a dry carbon dioxide recycle stream; optionally preheating the dry carbon dioxide recycle stream by heat exchanging the filtered flue gas stream with the dry carbon dioxide recycle stream to provide a preheated dry carbon dioxide recycle stream; and passing the preheated dry carbon dioxide recycle stream to the regenerator unit. An embodiment of the present disclosure is one, any or all of prior embodiments in this paragraph up through the first embodiment in this paragraph further comprising heating the recycle carbon dioxide stream to provide a warm carbon dioxide recycle stream; and recycling the warm carbon dioxide recycle stream to the regenerator unit. An embodiment of the present disclosure is one, any or all of prior embodiments in this paragraph up through the first embodiment in this paragraph wherein the HRSG comprises a superheated steam section and a saturated steam section. An embodiment of the present disclosure is one, any or all of prior embodiments in this paragraph up through the first embodiment in this paragraph further comprising passing the carbon dioxide rich flue gas stream into the superheated steam section of the HRSG to produce a superheated steam stream and a heat exchanged carbon dioxide rich flue gas stream, passing a boiler feed water stream and the heat exchanged carbon dioxide rich flue gas stream into the saturated steam section of the HRSG to form the partially cooled carbon dioxide rich flue gas stream and a saturated steam stream; introducing at least a portion of the saturated steam stream into the superheated steam section of the HRSG; and superheating the saturated steam stream with the carbon dioxide rich flue gas stream to produce the superheated steam stream.

A second embodiment of the present disclosure is a process for regenerating catalyst from an MTO process comprising providing an oxygen stream and a preheated carbon dioxide recycle stream; mixing the oxygen stream and the preheated carbon dioxide recycle stream to provide a carbon dioxide rich oxidation stream; separating the carbon dioxide rich oxidation stream into a first portion and a second portion; passing the first portion of the carbon dioxide rich oxidation stream to a regenerator unit to provide a carbon dioxide rich flue gas stream; passing the second portion of the carbon dioxide rich oxidation stream to heat recovery section to provide a partially cooled carbon dioxide rich flue gas stream and a steam stream; filtering the partially cooled carbon dioxide rich flue gas stream to remove the catalyst fines to produce a filtered flue gas stream; and taking a carbon dioxide recycle stream from the filtered flue gas stream.

A third embodiment of the present disclosure is an apparatus for regenerating catalyst comprising a heat recovery section comprising a superheated steam section and a saturated steam section; the superheated steam section having a flue gas inlet, a flue gas outlet, a saturated steam inlet, and a superheated steam outlet, the flue gas inlet of the superheated steam section in fluid communication with an outlet of a regenerator unit; and the saturated steam section having a flue gas inlet, a flue gas outlet, a boiler feed water inlet, and a saturated steam outlet, the flue gas inlet of the saturated steam section in fluid communication with the flue gas outlet of the superheated steam section, the saturated steam outlet of the saturated steam section in fluid communication with the saturated steam inlet of the superheated steam section; a filter section having a flue gas inlet, a flue gas outlet, and a filter material outlet, flue gas inlet of the filter section in fluid communication with the flue gas outlet of the saturated steam section of the heat recovery section; a heat exchanger having a flue gas inlet and a flue gas outlet, the flue gas inlet of the heat exchanger in fluid communication with the flue gas outlet of the filter section; and a carbon dioxide separation unit in fluid communication with the flue gas outlet of the heat exchanger, the carbon dioxide separation unit is in thermal communication with the flue gas outlet of the filter section via a carbon dioxide recycle stream in the heat exchanger.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for regenerating catalyst from a MTO process comprising:

providing an oxygen stream and a carbon dioxide recycle stream;

mixing said oxygen stream and said carbon dioxide recycle stream to provide a carbon dioxide rich oxidation stream;

passing said carbon dioxide rich oxidation stream to a regenerator unit to provide a carbon dioxide rich flue gas stream; and filtering said carbon dioxide rich flue gas stream to remove a catalyst fines and produce a filtered flue gas stream;

separating said filtered flue gas stream to provide said carbon dioxide recycle stream and a carbon dioxide stream for methanol synthesis; and passing said carbon dioxide stream for methanol synthesis to a methanol synthesis unit.

2. The process of claim 1 further comprising:

pre-heating said carbon dioxide recycle stream by heat exchange with said filtered flue gas stream to provide a preheated carbon dioxide recycle stream; and mixing said preheated carbon dioxide recycle stream and said oxygen stream to provide said carbon dioxide rich oxidation stream.

3. The process of claim 1 further comprising: partially removing water from the filtered flue gas stream to produce a partially dehydrated filtered flue gas stream before separating said partially dehydrated filtered flue gas stream in claim 1.

4. The process of claim 3 further comprising:

passing said carbon dioxide stream for methanol synthesis to a contaminant removal unit;

removing oxygen and optionally water from said carbon dioxide stream for methanol synthesis in the contaminant removal unit to produce a treated carbon dioxide stream; and passing said treated carbon dioxide stream to the methanol synthesis unit to produce a methanol stream.

5. The process of claim 4 wherein the methanol synthesis unit comprises a reverse water gas shift section and a methanol conversion section.

6. The process of claim 4 wherein the methanol synthesis unit comprises a direct carbon dioxide hydrogenation section.

7. The process of claim 4 wherein the methanol synthesis unit comprises a dry methane reforming section.

8. The process of claim 1 wherein the carbon dioxide rich oxidation stream comprises an oxygen concentration of no more than 35 mole %.

9. The process of claim 1 wherein said oxygen stream is provided from an electrolyzer or an air separation unit.

10. The process of claim 1 further comprising transferring heat from said carbon dioxide rich flue gas stream to a boiler feed water stream in a heat recovery section to form a partially cooled carbon dioxide rich flue gas stream and a steam stream.

11. The process of claim 10, wherein said heat recovery section is a heat recovery steam generator (HRSG) comprising:

transferring heat from said carbon dioxide rich flue gas stream to a boiler feed water stream in said HRSG to form said partially cooled carbon dioxide rich flue gas stream and said steam stream; and filtering said partially cooled carbon dioxide rich flue gas stream to produce said filtered flue gas stream.

12. The process of claim 10 further comprising:

separating said carbon dioxide rich oxidation stream into a first portion and a second portion;

passing the first portion of carbon dioxide rich oxidation stream to said regenerator unit; and passing the second portion of carbon dioxide rich oxidation stream to a CO combustor in said heat recovery section.

13. The process of claim 1 wherein said MTO process utilizes a SAPO catalyst.

14. The process of claim 1 further comprising:

passing said carbon dioxide rich flue gas stream to a third stage separator (TSS) to separate catalyst fines to an underflow stream and provide a carbon dioxide rich flue gas stream with reduced catalyst fines in an overflow stream;

generating electricity from said overflow stream in an expander; and passing said overflow stream to said heat recovery section.

15. The process of claim 1 further comprising:

cooling said filtered flue gas stream to provide a cooled filtered flue gas stream;

separating water from said cooled filtered flue gas stream to provide a dry flue gas stream; and separating said dry flue gas stream to provide said carbon dioxide recycle stream and a carbon dioxide stream for methanol synthesis.

16. The process of claim 15 further comprising:

compressing said carbon dioxide recycle stream to provide a compressed carbon dioxide recycle stream;

optionally passing the compressed carbon dioxide recycle stream to a low-pressure steam generator to provide a low-pressure steam stream and a partially cooled carbon dioxide recycle stream;

optionally cooling said partially cooled carbon dioxide recycle stream to provide a cooled carbon dioxide recycle stream;

optionally separating water from the cooled carbon dioxide recycle stream to provide a dry carbon dioxide recycle stream;

optionally preheating said dry carbon dioxide recycle stream by heat exchanging said filtered flue gas stream with said dry carbon dioxide recycle stream to provide a preheated dry carbon dioxide recycle stream; and passing said preheated dry carbon dioxide recycle stream to said regenerator unit.

17. The process of claim 15 further comprising:

heating said carbon dioxide recycle stream to provide a warm carbon dioxide recycle stream; and recycling said warm carbon dioxide recycle stream to said regenerator unit.

18. The process of claim 17 further comprising:

passing said carbon dioxide rich flue gas stream into the superheated steam section of said HRSG to produce a superheated steam stream and a heat exchanged carbon dioxide rich flue gas stream, passing a boiler feed water stream and the heat exchanged carbon dioxide rich flue gas stream into the saturated steam section of the HRSG to form said partially cooled carbon dioxide rich flue gas stream and a saturated steam stream;

introducing at least a portion of the saturated steam stream into the superheated steam section of the HRSG; and superheating the saturated steam stream with said carbon dioxide rich flue gas stream to produce the superheated steam stream.

19. A process for regenerating catalyst from an MTO process comprising:

providing an oxygen stream and a preheated carbon dioxide recycle stream;

mixing said oxygen stream and said preheated carbon dioxide recycle stream to provide a carbon dioxide rich oxidation stream;

separating said carbon dioxide rich oxidation stream into a first portion and a second portion;

passing the first portion of said carbon dioxide rich oxidation stream to a regenerator unit to provide a carbon dioxide rich flue gas stream;

passing the second portion of said carbon dioxide rich oxidation stream to heat recovery section to provide a partially cooled carbon dioxide rich flue gas stream and a steam stream;

filtering the partially cooled carbon dioxide rich flue gas stream to remove the catalyst fines to produce a filtered flue gas stream; and taking a carbon dioxide recycle stream from said filtered flue gas stream.

20. An apparatus for regenerating catalyst comprising:

a heat recovery section comprising a superheated steam section and a saturated steam section;

a regenerator unit having an outlet line;

the superheated steam section having a flue gas inlet, a flue gas outlet, a saturated steam inlet, and a superheated steam outlet, the flue gas inlet of the superheated steam section in fluid communication with the outlet line of said regenerator unit; and the saturated steam section having a flue gas inlet, a flue gas outlet, a boiler feed water inlet, and a saturated steam outlet, the flue gas inlet of the saturated steam section in fluid communication with the flue gas outlet of the superheated steam section, the saturated steam outlet of the saturated steam section in fluid communication with the saturated steam inlet of the superheated steam section;

a filter section having a flue gas inlet, a flue gas outlet, and a filter material outlet, flue gas inlet of the filter section in fluid communication with the flue gas outlet of the saturated steam section of the heat recovery section;

a heat exchanger having a flue gas inlet and a flue gas outlet, the flue gas inlet of the heat exchanger in fluid communication with the flue gas outlet of the filter section; and a carbon dioxide separation unit in fluid communication with the flue gas outlet of the heat exchanger, said carbon dioxide separation unit is in thermal communication with the flue gas outlet of the filter section via a carbon dioxide recycle stream in said heat exchanger, a knock out drum for removing water in communication with the filter section, a carbon dioxide recycle outlet in fluid communication with a carbon dioxide outlet of the knock out drum.

* * * * *